(12) United States Patent
Miyasita

(10) Patent No.: US 6,279,139 B1
(45) Date of Patent: Aug. 21, 2001

(54) TRANSMISSION SYSTEM

(75) Inventor: Tokio Miyasita, Tokyo (JP)

(73) Assignee: Oki Electric Industry Co., Ltd. (JP)

( * ) Notice: Subject to any disclaimer, the term of this patent is extended or adjusted under 35 U.S.C. 154(b) by 0 days.

(21) Appl. No.: 09/218,456

(22) Filed: Dec. 22, 1998

(30) Foreign Application Priority Data

Aug. 20, 1998 (JP) .................................................. 10-234590

(51) Int. Cl.⁷ ............................ G06F 11/00; H03M 13/00
(52) U.S. Cl. ...................................................... 714/801
(58) Field of Search ........................... 714/800, 801–804, 714/758, 750, 4, 6, 18, 752, 42, 23, 749, 704, 34; 710/22, 27, 3, 128; 703/25; 711/206

(56) References Cited

U.S. PATENT DOCUMENTS

| | | | |
|---|---|---|---|
| 4,947,366 | * | 8/1990 | Johnson ..................................... 710/3 |
| 5,136,594 | * | 8/1992 | Sharp ..................................... 714/800 |
| 5,349,683 | * | 9/1994 | Wu et al. .............................. 714/801 |
| 5,392,424 | * | 2/1995 | Cook ....................................... 714/52 |
| 5,515,507 | * | 5/1996 | Byers et al. ........................... 714/56 |
| 5,784,393 | * | 7/1998 | Byers et al. ........................... 714/800 |
| 6,098,179 | * | 8/2000 | Harter, Jr. ................................. 714/4 |

FOREIGN PATENT DOCUMENTS

| | | | |
|---|---|---|---|
| 3-74946 | 3/1991 | (JP) | ................................ H04L/1/12 |
| 5-88995 | 4/1993 | (JP) | ................................ G06F/13/00 |

OTHER PUBLICATIONS

Eu, H.J. et al. (A new performance estimation technique for digital transmission systems using a single parity check code; IEEE, Mar. 18, 1988).*

Matsuoka, S. et al. (Classified path restoration scheme with hitless protection switching for large–capacity trunk transmission networks; IEEE, Nov. 17, 1995).*
Tzeng, F.F et al.(Error protection for low rate speech transmission over a mobile satellite channel; IEEE, Dec. 5, 1990).*
Dhawan, S.; et al.(Design of self–checking sequential machines; IEEE, Oct. 1988).*
Redinho et al.(Multi–bit Correcting Data Interface for Fault-–Tolerant Systems;IEEE, Apr. 1993).*
Sharp et al.(Detection of Variable Message Lengths for NATO Improved Link Eleven Using CRC Codes; IEEE, Nov. 1991).*
Napolitano et al.(Fault–Tolerance in a High–Speed 2D Convolver/Correlator: Starloc; IEEE, Jun. 1989).*

* cited by examiner

Primary Examiner—Albert Decady
Assistant Examiner—Guy J Lamarre
(74) Attorney, Agent, or Firm—Venable; Robert J. Frank; James R. Burdett

(57) ABSTRACT

The first operation means of a master communication device computes a parity bit of main data. The parity bit and the main data are transmitted to a slave communication device. The second operation means of the slave communication device performs parity check of the main data using this parity bit. The third operation means computes a parity bit of a data constellation comprising a signal for indicating the result of the parity check and the main data to be transmitted to the master communication device. This parity bit is transmitted to the master communication device along with the main data. The fourth operation means of the master communication device performs parity check of the main data using this parity bit. If the result of parity check by the second operation means indicates generation of an error, the result of parity check by the fourth operation means always indicates generation of an error.

17 Claims, 15 Drawing Sheets

TRANSMISSION SYSTEM

BACKGROUND OF THE INVENTION

1. Field of the Invention

The present invention relates to a transmission system which connects communication devices with a transmission path and a receiving path, and performs bi-directional data communication synchronizing the transmission path and the receiving path.

2. Description of Related Art

In a transmission system which performs bi-directional data communication, transmission quality may deteriorate on transmission paths. A transmission error is an example of transmission deterioration. Quality deterioration, such as a transmission error, is caused, for example, by an age-based change of characteristics of an amplifier and a timing regeneration circuit equipped on a transmission path, and the alteration of transmission data caused by an accident.

An operator of a transmission system must maintain the transmission system by constantly detecting the degree of transmission errors.

Parity check is one method to detect a transmission error. In parity check, a "0" or "1" parity bit is added to transmission signals to regulate the transmission signals, and a communication device at the receive side detects a transmission error by judging whether this regularity is maintained after transmission.

Another method to detect a transmission error is to return data from the communication device at the receive side to the communication device at the transmission side, comparing the transmission signals and returned signals by the communication device at the transmission side.

In parity check, the communication device at the receive side can detect transmission quality in real-time, however the communication device at the transmission side cannot detect the transmission quality. That is, with known methods, it is impossible for the communication device at one end to detect transmission quality of both the transmission path and receiving path.

The method for returning receive signals, on the other hand, decreases transmission speed substantially because primary communication is stopped during the return of data.

SUMMARY OF THE INVENTION

An object of the present invention is to provide a transmission system which can detect the transmission quality of both a transmission path and a receiving path, without dropping transmission speed substantially.

The transmission system related to the present invention comprises the first operation means installed in a master communication device for computing a parity bit of a data constellation including main data, the second operation means installed in a slave communication device for performing parity check of main data received from the above mentioned master communication device, the third operation means installed in the slave communication device for computing a parity bit of a data constellation including the main data and output signals of the second operation means, and the fourth operation means installed in the master communication device for performing parity check of the main data received from the slave communication device.

In a system having this configuration, if the result of parity check by the second operation means indicates error generation, the result of parity check by the fourth operation means always indicates error generation. Therefore, the master communication device can detect error generation in the data which the master communication device transmits to the slave communication device.

BRIEF DESCRIPTION OF THE DRAWINGS

The foregoing and other objects, features and advantages of the present invention will be better understood from the following description taken in connection with the accompanying drawings in which.

DESCRIPTION OF THE PREFERRED EMBODIMENTS

Figure 1:
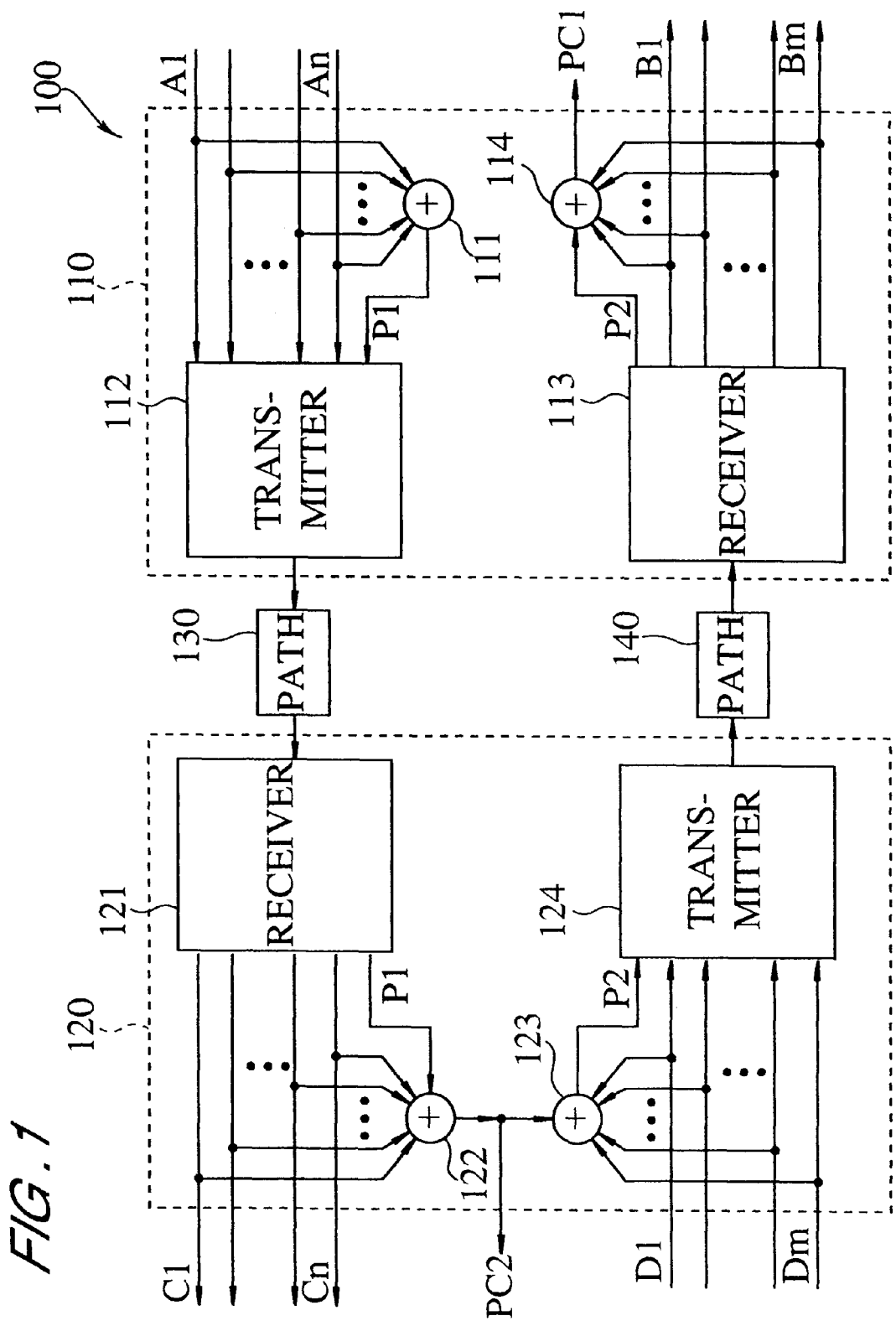
FIG. 1 is a block diagram depicting an overview of the configuration of the transmission system in accordance with the first embodiment.

The embodiments of the present invention will be described referring to the drawings. Note that the size, shape and locational relationship of each element in the drawings have been simplified only for explanatory purposes, and that numerical conditions to be used in the following description are only examples.

The First Preferred Embodiment

Figure 2:
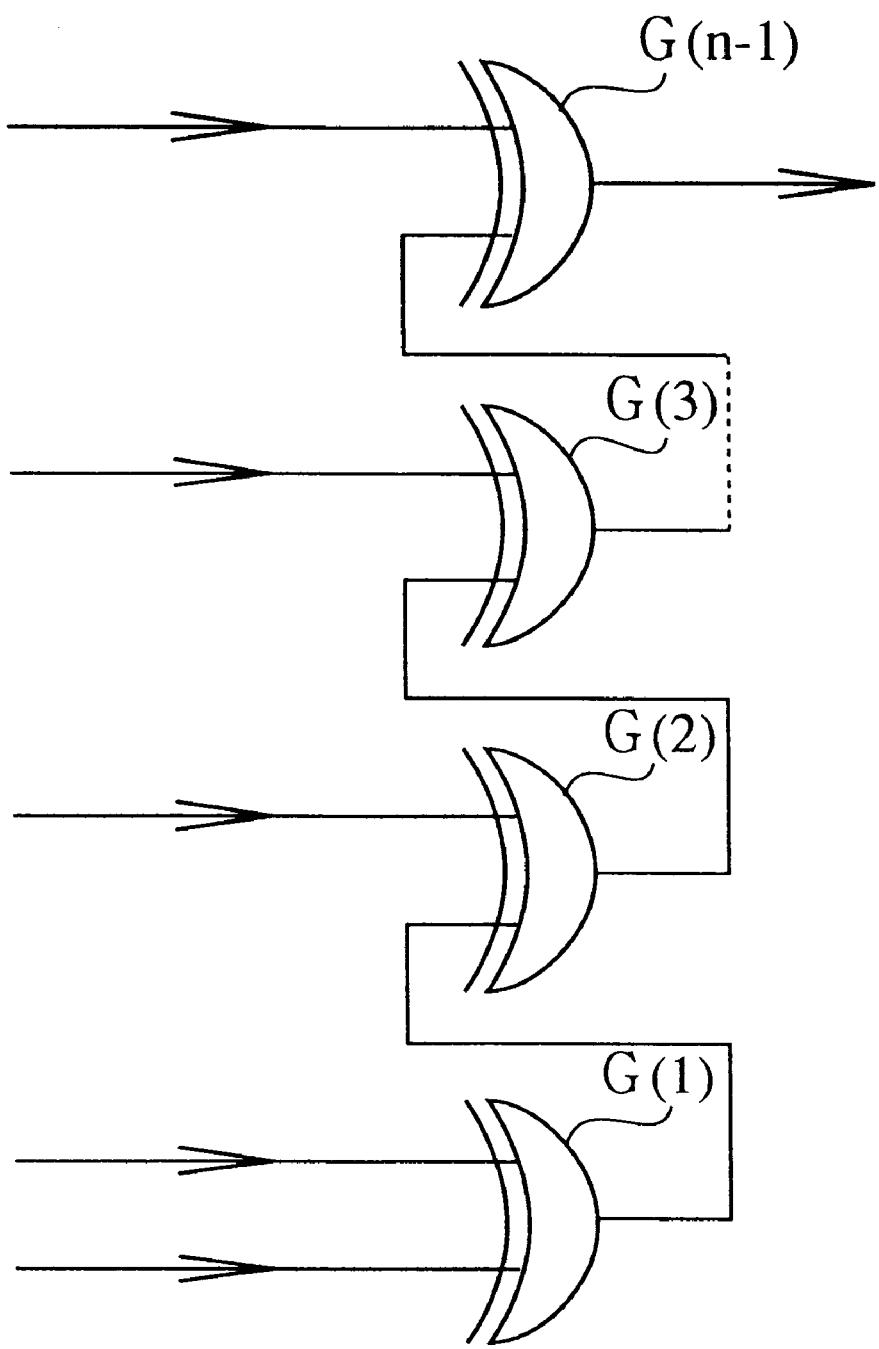
FIG. 2 is a logic circuit diagram depicting an example of an internal configuration of the adder shown in FIG. 1.

A transmission system in accordance with the first embodiment of the present invention is described referring to FIG. 1 and FIG. 2.

As FIG. 1 shows, this transmission system 100 comprises two communication devices 110 and 120, and two transmission paths 130 and 140 which connect the communication devices 110 and 120.

In the master communication device 110, an adder 111 loads n bits of main data from n units of signal lines A1~An, and computes parity bit P1. This means that this adder 111 sequentially adds the n units of binary data, and outputs the value of the first digit of the obtained computation result as parity bit P1. Therefore, if n bits of main data includes an odd number of "1"s, then P1=1, and if n bits of main data includes an even number of "1"s, then P1=0.

As shown in FIG. 2, the adder 111 has n−1 stages of exclusive-OR gate G (1)~G (n−1). Signal lines A1 and A2 are connected to the input terminals of the gate G (1) at the first stage. For the gate G (2)~G (n−1) at the second or later stages, one input terminal is connected to the output terminal of the gate at a previous stage and the other input terminal is connected to one of the signal lines A3~An. As is well known, an exclusive-OR gate operates according to the addition algorithm 1+0=1, 0+1=1, 1+1=0 and 0+0=0, therefore the parity bit can be computed by the circuit configuration shown in FIG. 2.

The transmitter 112 outputs the main data which is input from the signal lines A1~An and the parity bit P1 which is input from the adder 111 to the transmission path 130. This means that the number of bits of the transmission data is n+1.

The receiver 113 receives the main data and the parity bit P2 from the transmission path 140. Then outputs the parity data P2 to the signal line B0, and outputs the main data to the signal lines B1~Bm.

The adder 114 fetches this m+1 bits of data from the signal lines B0~Bm, and then adds the m+1 units of binary data sequentially and outputs the value at the first digit of the operation result as parity check signal PC1. The adder 114 can have the same circuit configuration as the adder 111 (see FIG. 2). The number of stages of the exclusive-OR gate, however, is m, since m+1 units of binary data is used for the operation.

In the slave communication device 120, the receiver 121 receives the main data and parity bit P1 from the communication device 110 via the transmission path 130, and then outputs the parity data P1, and outputs the main data to the signal lines C1~Cn.

The adder 122 fetches the n+1 bits of data from the signal lines C1~Cn. P1, and then adds the n+1 units of binary data sequentially and outputs the value at the first digit of the operation result as parity check signal PC2. The adder 122 can have the same circuit configuration as the adder 111 (see FIG. 2). The number of stages of the exclusive-OR gate, however, is n, since n+1 units of binary data is used for operation.

The adder 123 fetches the m bits of transmission signals from the signal lines D1~Dm, and fetches parity check signal PC2 from the adder 122, and then outputs the value at the first digit of the operation result after sequentially adding these m+1 units of binary data. The adder 122 can have the same circuit configuration as the adder 111 (see FIG. 2). The number of stages of the exclusive-OR gate, however, is m, since m+1 units of binary data is used for operation.

The transmitter 124 outputs the main data which is input from the signal lines D1~Dm and the parity bit P2 which is input from the adder 123 to the transmission path 140. This means that the number of bits of the transmission data is m+1. It is a matter of course that the bit number of main data "m" may be equal to the bit number "n" as described above.

Next the operation of this transmission system 100 is described.

First, the adder 111 computes the parity bit P1 as described above.

The transmitter 112 of the communication device 110 inputs n bits of main data from the signal lines A1~An and inputs the parity bit P1 corresponding to the main data from the adder 111. The transmitter 112 sends the n+1 bits of data to the communication device 120 via the transmission path 130. This means that a signal block for one transmission consists of n bits of main data and a parity bit. The transmitter 112 repeatedly transmits multiple signal blocks at a constant interval.

The transmission interval At of each signal block is determined by the operation speed of the adder 111. This means that the output of the main data must be delayed for the time required for the adder 111 to compute the parity bit P1 in order to synchronously transmit the main data and the parity bit P1. This delay can be implemented, for example, by installing a delay circuit in the transmitter 112.

The receiver 121 of the communication device 120 regenerates the signal block which is received from the communication device 110, and outputs the main data and the parity bit P1. The adder 122 inputs this data and computes the parity check signal PC2 by the above mentioned operation.

As described above, in the operation of the adder 122, the value of the first digit of the result after the main data and parity bit P1 are sequentially added is used. The parity bit P1 is a value of the first digit of the result after the main data is sequentially added. Therefore in the operation of the adder 122, the parity bit of the received main data is computed and exclusive-OR of the computed parity bit and the received parity bit P1 is determined. By determining the exclusive-OR, the computed parity bit and the received parity bit P1 can be compared.

If the exclusive-OR is "0", which means that these parity bits match, then it is judged that no transmission error exists in the received signal block. If the exclusive-OR is "1", which means that these parity bits do not match, then it is judged that a transmission error exists in the received signal block. As a consequence, the communication device 120 can detect the existence of a transmission error by the signal level of the parity check signal PC2, whether the signal level is "0" or "1".

Then the adder 123 performs the above mentioned operation using the main data fetched from the signal lines D1~Dm and the parity check signal PC2. The operation result P2 is the exclusive-OR of the parity check signal PC2 and the parity bit of the main data fetched from the signal lines D1~Dm.

As described above, PC2=0 if a transmission error does not exist in the signal block which the receiver 121 received from the communication device 110, and PC2=1 if a transmission error exists in the signal block. So if a transmission error does not exist in the signal block, the parity bit P2 matches with the parity bit of the main data fetched from the signal lines D1~Dm. If a transmission error exists in the signal block, on the other hand, the parity bit P2 is an inverted value of the parity bit of the main data fetched from the signal lines D1~Dm.

The transmitter 124 inputs m bits of data from the signal lines D1~Dm, and inputs the parity bit P2 corresponding to the main data from the adder 123. Then the transmitter 124 transmits the m+1 bits of data as one signal block to the communication device 110 via the transmission path 140. This transmission as well is performed for each signal block, just as in the case of the transmitter 112. The transmission interval of each signal block is determined by the operation speed of the adder 123.

The receiver 113 of the communication device 110 regenerates the signal block received from the communication device 120, and outputs the main data and the parity bit P2.

Then the adder 114 inputs the data and computes the parity check signal PC1 by the above mentioned operation.

The adder 114 computes the parity bit of the received main data and determines exclusive-OR of the computed parity bit and the received parity bit P2. As described above, the value of the parity bit P2 differs depending on whether an error exists in the signal block transmitted on the transmission path 140.

Therefore if an error exists in the signal block transmitted on the transmission path 140, the value of the parity check signal PC1 is "1", even if no error exists in the signal block transmitted on the transmission path 130. And if an error exists in the signal block transmitted on the transmission path 130, the value of the parity check signal PC1 is "1", even if no error exists in the signal block transmitted on the transmission path 140.

If no error exists in the signal block transmitted on the transmission path 130 and if no error exists in the signal block transmitted on the transmission path 140 either, then the value of the parity check signal PC1 is "0".

The value of the parity check signal PC1 is also "0" when an error occurs to both the signal block transmitted on the transmission path 130 and the signal block transmitted on the transmission path 140. However, the probability that a 1 bit error will be generated simultaneously on both transmission paths 130 and 140 is extremely low, that is, the square of the probability that a 1 bit error will be generated on one of the transmission paths 130 and 140, therefore this can be ignored under ordinary communication conditions.

When the error rate is extremely small, the parity check signal PC1 and the parity check signal PC2 can be used as conventional parity error detection bits.

In this way, the transmission system in accordance with this embodiment allows the communication device 110 to detect an error on both transmission paths 130 and 140 merely by monitoring the parity check signal PC1.

The number of bits of information to be transmitted by this transmission system is the same as the case of using a conventional parity check method, which means that substantial transfer speed does not drop.

When the error rate is extremely small, a parity check signal can be used as a conventional parity error detection bit, therefore the design of the processor which handles data received by the communication device 110 does not have to be changed.

Unlike the conventional method of returning receive signals, this system does not have to check main data, therefore the load required to monitor transmission errors decreases, and the security of communication of a user is guaranteed.

In the known case of the "method of returning receive signals", means for switching transmission/reply must be installed in the communication device since the receive data is replied, however the communication device in accordance with this embodiment does not need to install such means.

Second Preferred Embodiment

Figure 3:
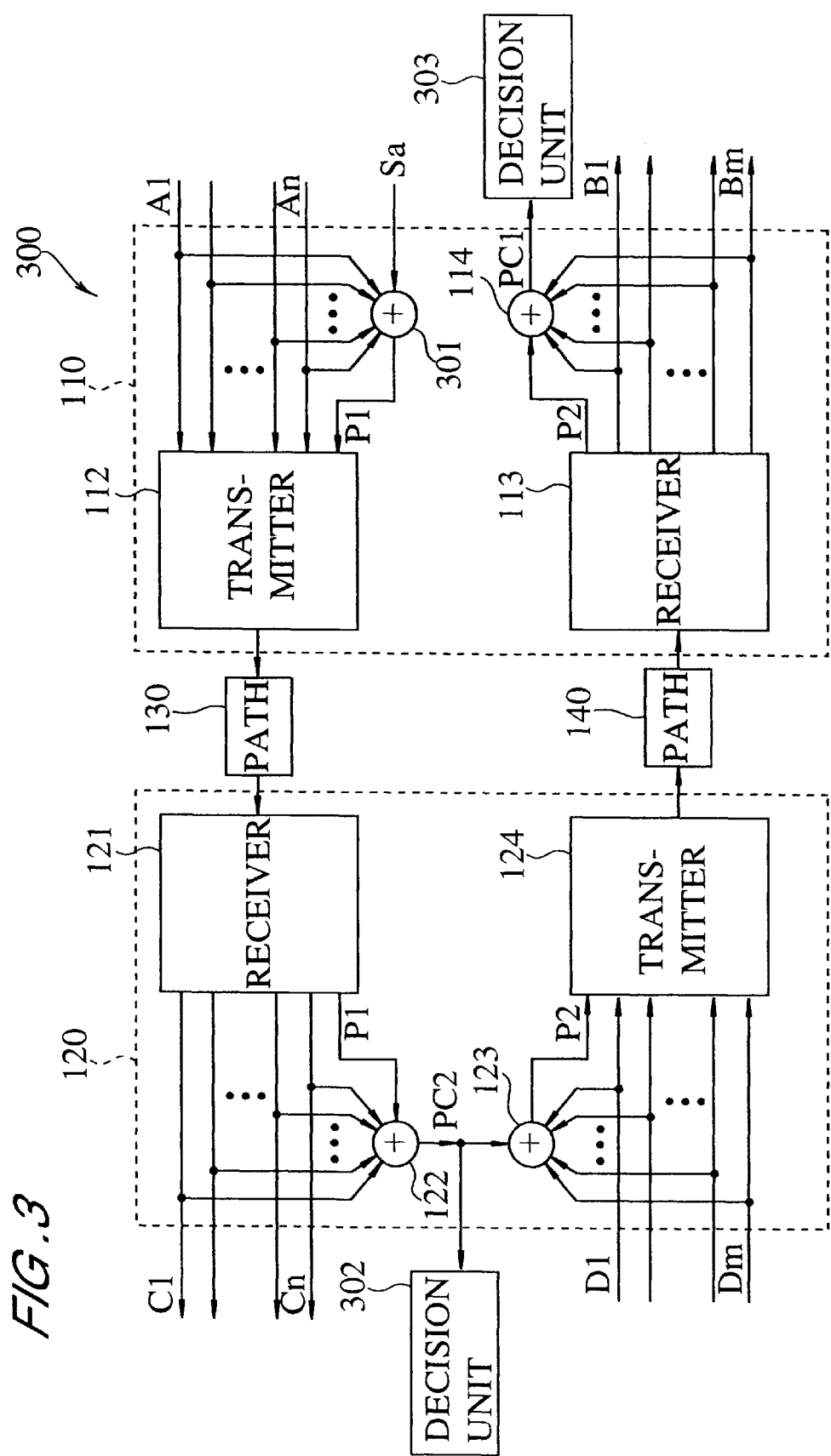
FIG. 3 is a block diagram depicting an overview of the configuration of the transmission system in accordance with the second embodiment.
Figure 4:
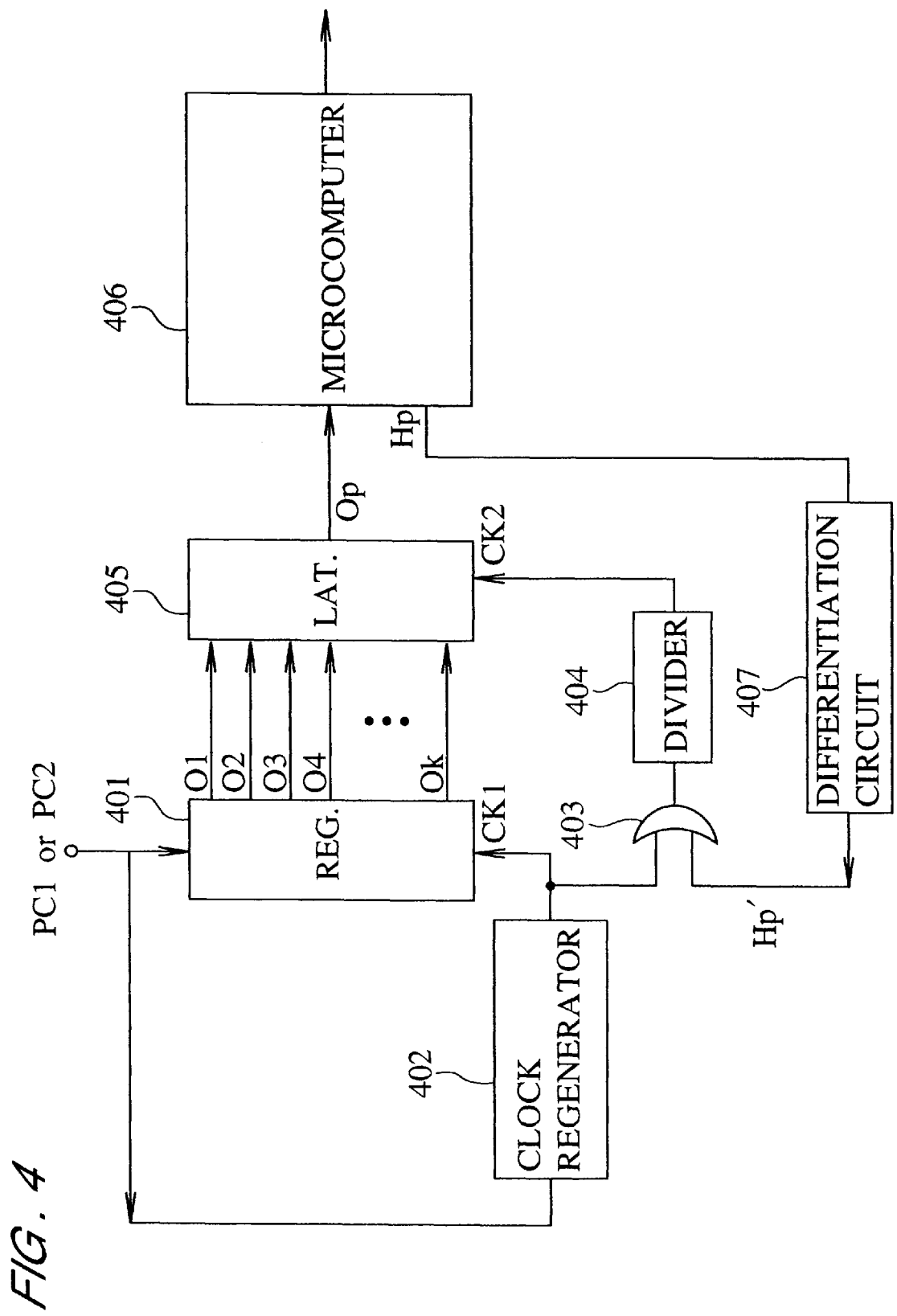
FIG. 4 is a logic circuit diagram depicting an example of an internal configuration of the decision unit shown in FIG. 3.
Figure 5A:
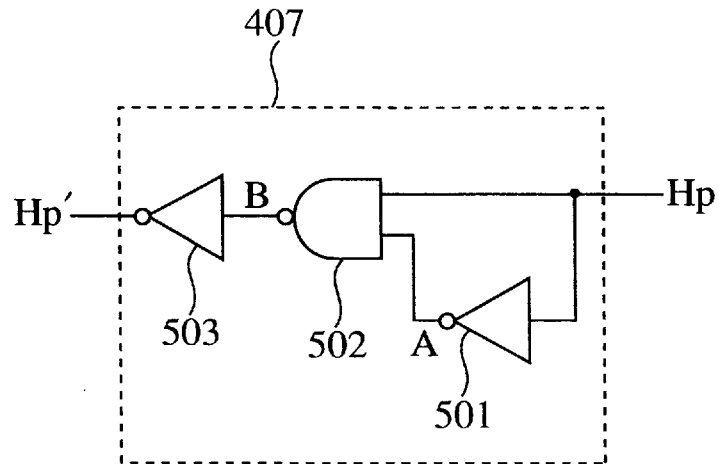
FIG. 5(A) is a logic circuit diagram depicting an example of an internal configuration of the differentiation circuit shown in FIG. 4.
Figure 5B:
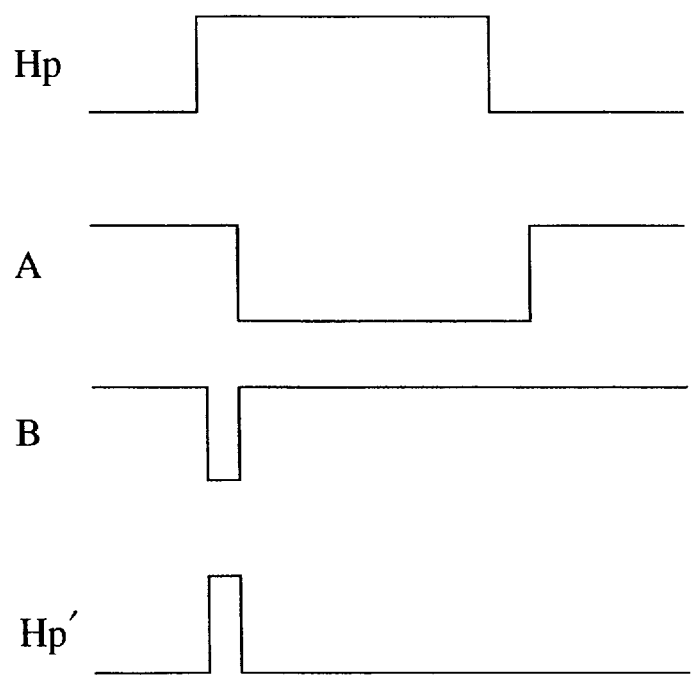
FIG. 5(B) is a timing chart depicting the operation of the differentiation circuit shown in (A)

Next a transmission system in accordance with the second embodiment is described referring to FIG. 3–FIG. 5.

In FIG. 3, if an element has the same numeral or sign as FIG. 1, it means that the element is the same as in FIG. 1.

In the transmission system 300 shown in FIG. 3, the adder 301 fetches the main data from the n bits of signal lines A1~An, also fetches the reflected signal Sa from the outside, sequentially adds the n+1 bits of binary data, and outputs a value of the first digit of the obtained operation result as the parity bit P1. The adder 301 can have the same circuit configuration as the adder 111 used for the first embodiment (see FIG. 2). The number of stages of the exclusive-OR gate, however, is n, since n+1 units of binary data is used for operation.

The reflected signal Sa repeats a constant pattern synchronizing with the cycle when the adder 301 fetches the main data. This pattern may be a repeat of "0" and "1", but may also be a pattern where the ratio of "0" and "1" is not 1:1, such as a repeat of "1011".

The decision unit 302 compares the same signal pattern as the reflected signal Sa with the pattern of the parity check signal PC2 which is input from the adder 122.

The decision unit 303 compares the signal pattern generated when the reflected signal Sa is delayed for a prescribed time with the pattern of the parity check signal PC1 which is input from the adder 114.

FIG. 4 is a circuit diagram depicting an example of an internal configuration of the decision units 302 and 303.

As shown in FIG. 4, this decision unit comprises a shift register 401, a clock regenerator 402, an OR gate 403, a divider 404, a data latch 405, and a microcomputer for bit pattern recognition 406.

The shift register 401 has k stages of registers (k is 2 or a higher natural number) which sequentially stores parity check signals (PC1 or PC2), which are input from the outside, according to the timing provided by the clock CK1.

The clock regenerator 402 regenerates clock signal CK1 from the pattern of the parity check signal which is input from the outside.

The OR gate 403 inputs clock CK1 from one input terminal, and inputs correction pulse Hp' from the other input terminal.

The divider 404 divides a signal which is input from the OR gate 403 into 1/k, and outputs the signal after division as clock CK2.

The data latch 405 inputs k units of data (parity check signals) O1 Ok from the shift register 401 in parallel at timing of the clock CK2 for latching. The latched data O1~Ok is output as data Op.

The microcomputer 406 internally stores the same signal pattern as the reflected signal Sa, and compares this signal pattern with the data Op, and judges whether the data matches or not. The microcomputer 406 outputs one correction pulse Hp if the data does not match at the initial stage.

The differentiation circuit 407 inputs Hp from the microcomputer 406, and generates a high-speed pulse Hp'. In this differentiation circuit 407, as shown in FIG. 5, the NAND gate 502 inputs the correction pulse Hp from one input terminal and inputs the output signal of the NOT gate 501, that is, an inverted value of the correction pulse Hp, from the other input terminal. Since the rise of output of the NOT gate is slower than the rise timing of the correction pulse Hp, a pulse with width according to the delay time is output from the NAND gate 502. The NOT gate 503 inverts the signal which is input from the NAND gate 502, and outputs the signal. With such a configuration, the differentiation circuit 407 can generate a short pulse according to the operation speed of the NOT gate 501, and outputs the pulse as a high-speed correction pulse Hp'. If the operation speed of the microcomputer 406 is fast enough, the correction pulse Hp may be supplied directly to the OR gate 403, without installing the differentiation circuit 407.

Next the operation principle of the decision unit shown in FIG. 4 is described.

First, parity check signals are sequentially input to the shift register 401 at the timing of the clock CK1. Since at this time the correction pulse is at a low level, this CK1 is also input to the divider 404 via the OR gate 403. When the number of input clocks reaches k, the divider 404 outputs one clock CK2. By the clock CK2, the data latch 405 fetches data O1~Ok from the shift register 401 for latching. This means that the data latch 405 latches data each time the shift register 401 stores k number of parity check signals. The microcomputer 406 compares the latched data and the internally stored data, and outputs one correction pulse Hp if data does not match. Because of this, timing when the divider 404 outputs the clock CLK2 is delayed for one clock CK1, that is, for one parity check signal. By repeating such an operation series, the phase shift between the pattern of the stored data and the pattern of the parity check signal PC2 can be corrected, and both of the patterns can be perfectly matched. If the patterns do not match after phase shift correction, the microcomputer 406 outputs the result of the decision, that is, a mismatch of the patterns, without outputting the correction pulse Hp. As described later, a mismatch of patterns indicates that an error occurred to the transmission path.

Next the general operation of the transmission system 300 shown in FIG. 3 is described.

First the adder 301 performs the above mentioned operation using the main data and the reflected signal Sa, and outputs the parity bit P1.

When the logic level of the reflected signal Sa is "0" in this operation, P1=1 if the number of "1"s in the main data is odd, and P1=0 if the number is even. Therefore if Sa=0, the total number of "1"s in the signal block, which consists of the main data and parity bit P1, is always even.

When the logic level of the reflected signal Sa is "1", P1=0 if the number of "1"s in the main data is odd, and P1=1 if the number is even. Therefore if Sa=1, the total number of "1"s in the signal block is always odd.

The transmitter 112 of the communication device 110 inputs n bits of the main data from the signal lines A1~An, and inputs the parity bit P1 corresponding to the main data from the adder 301. Then the transmitter 112 transmits a signal block which consists of this data to the communication device 120 via the transmission path 130. Just as with the above mentioned first embodiment, multiple signal blocks are sequentially transmitted at a constant cycle in this embodiment.

The receiver 121 of the communication device 120 regenerates the signal block received from the communication device 110, and outputs the main data and the parity bit P1. The adder 122 inputs this data and computes the parity check signal PC2.

Then the decision unit 302 makes a comparison as described above. As explained in the first embodiment, the logic value of the parity check signal PC2 is "0" if the number of "1"s in the signal block is even, and is "1" if the number of "1"s is odd. Therefore if no error occurred during transmission of the signal block from the communication device 110 to the communication device 120, the pattern of the signal which is output by the parity check signal PC2 matches with the pattern of the reflected signal Sa. This means that no transmission error occurred if the signal PC2 and signal Sa match, and that a transmission error occurred if they do not match. This decision result is output from the decision unit 302.

Then the adder 123 computes the parity bit P2 in the same way as the first embodiment.

And the transmitter 124 transmits the main data, which is input from the signal, lines D1~Dm, and the parity bit P2, which is input from the adder 123, as one signal block. At this time, the transmitter 124 extracts synchronization timing from the parity check signal PC2 to transmit the signal block so that the transmission speed synchronizes with the communication device 110.

The receiver 113 of the communication device 110 regenerates the signal block received from the communication device 120, and outputs the main data and the parity bit P2.

And the adder 114 inputs this data and computes the parity check signal PC1 by an operation similar to the first embodiment.

Then the decision unit 303 makes a comparison as described above. Just as with the signal PC2, the logic value of the parity check signal PC1 matches with the logic value of the reflected signal Sa if no error occurred to both the transmission paths 130 and 140. If a transmission error occurred to either one of the transmission paths 130 and 140, on the other hand, the signal PC1 and the signal Sa do not match. This means that if no transmission error exists, the pattern of the signal which the parity check signal PC1 outputs is a pattern that occurs when the pattern of the reflected signal Sa is delayed.

The probability that a 1 bit error will be generated simultaneously in both of the transmission paths 130 and 140 can be ignored, for the same reason as the first embodiment.

Just as with the first embodiment, the transmission system in accordance with this embodiment also allows the communication device 110 to detect an error on both of the transmission paths 130 and 140 merely by monitoring the parity check signal PC1, without dropping substantial transfer speed, and if the error rate is extremely small, the parity check signals can be used as a conventional parity error detection bit, without the need to check main data, and means for switching transmission/reply do not have to be installed in the communication device.

With this embodiment as well, the use of the reflected signal Sa makes it difficult to generate a signal status where logic level "0" continues, or a signal status where logic level "1" continues. This makes it easy to use the parity check signals PC1 and PC2 as a signal pattern for timing extraction.

When a communication device having an auto gain control (AGC) function is used, this embodiment can improve the stability of AGC. Transmission signals are generally amplified to correct rounding of the signals on the transmission path. If there are insufficient opportunities for the logic level to be inverted at this amplification, the amplitude of the signal cannot be accurately detected. With this embodiment, however, opportunities of logic level inversion can be arbitrarily set by selecting the pattern of the reflected signal Sa, and therefore the signal amplitude can be accurately detected, and the stability of AGC can be improved.

With this embodiment, the parity check signals PC1 and PC2 can be used as reflected signals, so it is unnecessary to transmit the reflected signals on the transmission paths 130 and 140. As a consequence, timing extraction and improvement of the stability of AGC can be implemented without dropping substantial transmission speed of the main data.

Also with this embodiment, disconnection of the transmission paths 130 and 140 can be detected by monitoring the parity check signals PC1 and PC2 by the communication devices 110 and 120. In the case of a system where the values of the parity check signals PC1 and PC2 change only when a transmission error occurs, it is impossible to distinguish the disconnection of the transmission paths 130 and 140 from a case when the data of the transmitted signal block is all "0". With this embodiment, however, this is possible by monitoring the pattern of the reflected signal Sa.

As mentioned above, the pattern of the reflected signal Sa may be a repeat of "0" and "1", or may be a pattern where the ratio of "0" and "1" is not 1:1, but, if a pattern where the ratio is not 1:1 is used, it is easier to detect a mismatch of the reflected signal Sa and the parity check signals PC1 and PC2.

The Third Embodiment

Figure 6:
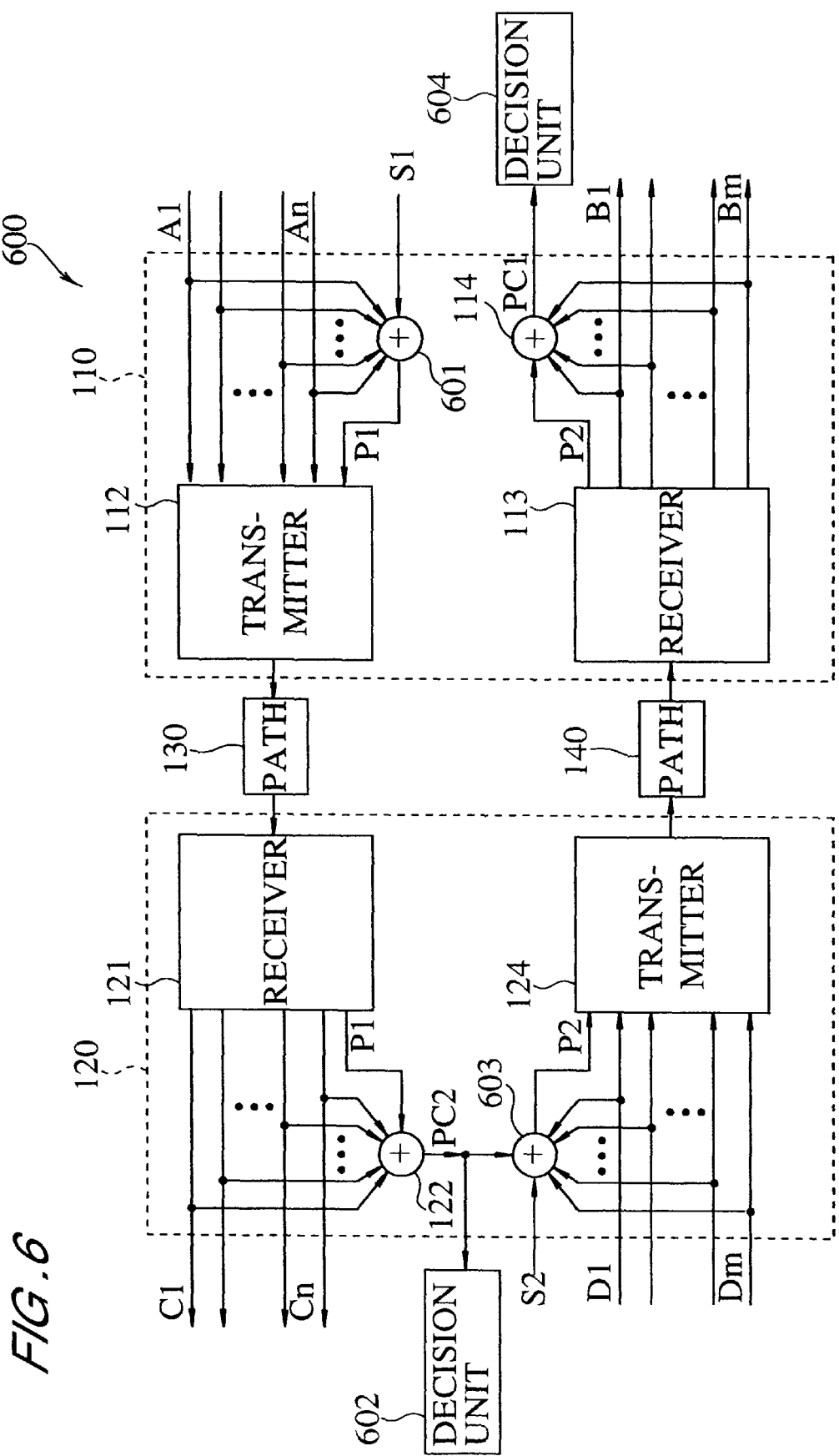
FIG. 6 is a block diagram depicting an overview of the configuration of the transmission system in accordance with the third embodiment.

Next a transmission system in accordance with the third embodiment is described referring to FIG. 6.

In FIG. 6, if an element has the same numeral or sign as FIG. 1, it means that the element is the same as in FIG. 1.

In the transmission system 600 shown in FIG. 6, the adder 601 fetches the main data from the n bits of signal lines A1~An, and also fetches the low speed signal S1 from the outside, and computes the parity bit P1 in the same way as the above mentioned embodiments. The adder 601 can have the same circuit configuration as the adder 111 used for the first embodiment (see FIG. 2). The number of stages of the exclusive-OR gate, however, is n, since n+1 units of binary data is used for operation.

For the low speed signal S1 here, multiple types of signal patterns have been prescribed, and one of these signal patterns is used as the low speed signal S1.

The decision unit 602 internally stores the above mentioned multiple types of signal patterns. The decision unit 602 selects the same signal pattern as the parity check signal PC2, and outputs the selection result.

The adder 603 fetches the main data from the m bits of signal lines D1~Dm, and also fetches the low speed signal S2 from the outside, and computes the parity bit P2. The adder 603 can have the same circuit configurations as the adder 111 used for the first embodiment (see FIG. 2). The number of stages of the exclusive-OR gate, however, is n, since n+1 units of binary data is used for operation.

For the low speed signal S2, multiple types of signal patterns have been prescribed, just like signal S1.

The decision unit 602 internally stores multiple types of signal patterns which are same as signals S2. The decision unit 602 selects the same signal pattern as the parity check signal PC1, and outputs the selected result.

Next the general operation of the transmission system 600 shown in FIG. 6 is described.

First the adder 601 performs operation using the main data and the low speed signal S1, and outputs the parity bit P1. In this operation, the total number of "1"s in the block signal is always even if the low speed signal S1 is "0", and the total number of "1"s of the signal block is always odd if the low speed signal S1 is "1", just as with the case of the second embodiment.

The transmitter 112 of the communication device 110 transmits data in signal block units.

The receiver 121 of the communication device 120 regenerates and outputs the main data and the parity bit when a signal block is received.

The adder 122 inputs this data and computes the parity check signal PC2.

The decision unit 602 sequentially compares the signal PC2 with the multiple signal patterns internally stored. For the same reason as the second embodiment, the signal PC2 matches one of the stored signal patterns if no error occurred on the transmission path 130. This means that a transmission error did not occur if the signal PC2 matches one of the stored signal patterns, and that a transmission error occurred if there is no match. This decision result is output to the circuit in the next stage (not illustrated) of the communication device 120. If no transmission error occurred, the type of the signal pattern which matched with the signal PC2 is also output to the circuit in the next stage along with the decision result.

Then the adder 603 computes the parity bit P2 using the main data, parity check signal PC2 and the low speed signal S2.

The transmitter 124 transmits the main data and the parity bit P2. At this time, the transmitter 124 extracts synchronization timing from the parity check signal PC2 to transmit the signal block so that the transmission speed synchronizes with the communication device 110.

The receiver 113 of the communication device 110 regenerates the signal block received from the communication device 120, and outputs the main data and the parity bit P2.

And the adder 114 inputs this data and computes the parity check signal PC1 by an operation similar to the first embodiment.

The decision unit 604 sequentially compares the signal PC1 with the multiple signal patterns internally stored. Just as with the signal PC2, the logic value of the parity check signal PC1 matches with one of the stored signal patterns if no a transmission error occurred to both the transmission paths 130 and 140. This decision result is output to the circuit in the next stage (not illustrated) of the communication device 110. If no transmission error occurred, the type of the signal pattern which matched with the signal PC1 is also output to the circuit in the next stage along with the decision result.

With a transmission system in accordance with this embodiment, a low speed signal can be exchanged between the communication devices 110 and 120 along with the main data. One of the multiple type of low speed signals is a meaningless signal and the others are meaningful. Therefore the desired signal can be exchanged between the communication devices 110 and 120 separate from the main data. For example, a control signal can be exchanged as a low speed signal.

The signal pattern of the parity bit P2 which the communication device 120 transmits to the communication device 110, however, changes depending not only on the signal S2 but also on the pattern of the signal PC2. Therefore, the decision section 604 must decide the pattern of the signal S2, considering the pattern of the signal PC2. In this case, if the communication device 120 does not send a meaningful signal to the communication device 110 immediately after the communication device 110 transmits a meaningful signal to the communication device 120, then the signal pattern decision by the decision section 604 can be simplified.

It is desirable to apply this embodiment to a transmission system where the error generation rate of the transmission system is sufficiently small, and it is also desirable to take a sufficiently long inversion interval for the low speed signal S1, S2.

In this way, this embodiment can transmit the low speed signals without increasing the transmission data volume, in addition to the effects similar to the above mentioned first and second embodiments.

The Fourth Embodiment

Figure 7:
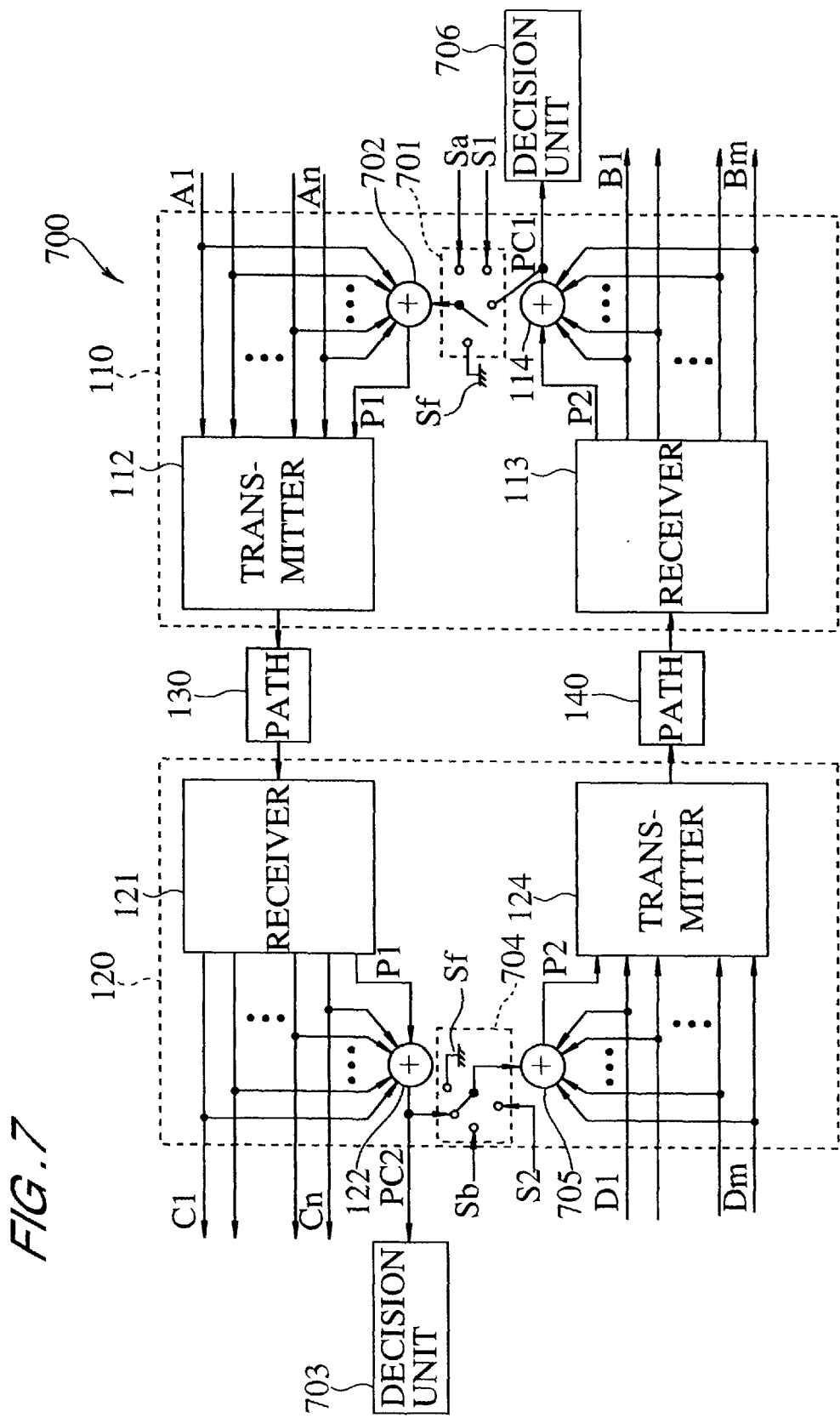
FIG. 7 is a block diagram depicting an overview of the configuration of the transmission system in accordance with the fourth embodiment.

Next a transmission system in accordance with the fourth embodiment is described referring to FIG. 7.

In FIG. 7, if an element has the same numeral or sign as FIG. 1, it means that the element is the same as in FIG. 1.

In FIG. 7, the switch 701 outputs one of the reflected signal Sa, low speed signal S1, fixed signal Sf and the parity check signal PC1.

The adder 702 fetches the main data from the n bits of signal lines A1~An, and also fetches one of the signals Sa, S1, Sf and PC1 from the switch 701, and computes the parity bit P1 in the same way as the above mentioned embodiments. The adder 702 can have the same circuit configuration as the adder 111 used for the first embodiment (see FIG. 2). The number of stages of the exclusive-OR gate, however, is n, since n+1 units of binary data is used for operation.

The decision unit 703 internally stores the patterns of signals Sa, S1 and Sf. The decision unit 703 selects the same signal pattern as the parity check signal PC2 from the stored signal patterns, and outputs the selected result.

The switch 704 outputs one of the reflected signal Sb, low speed signal S2, fixed signal Sf and parity check signal PC2.

The adder 705 fetches the main data from the m bits of signal lines D1~Dm, and also fetches one of the signals Sb, S2, Sf and PC2 from the switch 704, and computes the parity bit P2. The adder 705 can have the same circuit configuration as the adder 111 used for the first embodiment (see FIG. 2). The number of stages of the exclusive-OR gate, however, is m, since m+1 units of binary data is used for operation.

The decision unit 706 internally stores the above mentioned multiple types of signal patterns. The decision unit 706 selects the same signal pattern as the parity check signal PC1 from the stored signal patterns, and outputs the selected result.

The reflected signals Sa and Sb here can be the same signals as the reflected signal Sa used for the above mentioned second embodiment. The low speed signals S1 and S2 can be the same signals as the one used for the third embodiment. The fixed signal Sf is a signal that is fixed to "1" or "0".

In the transmission system 700 shown in FIG. 7, if the input of the switch 701 is set to the fixed signal Sf, and the input of the switch 704 is set to the parity check signal PC2, then the system can be operated in the same manner as the above mentioned transmission system 100 in accordance with the first embodiment (see FIG. 1).

If the input of the switch 701 is set to the reflected signal Sa and if the input of the switch 704 is set to the signal PC2, then the transmission system 700 can be operated in the same manner as the above mentioned transmission system 300 in accordance with the second embodiment (see FIG. 3).

If the input of the switch 701 is set to the low speed signal S1, and if the input of the switch 704 is set to the signal PC2, then the transmission system 700 can be operated in the same manner as the above mentioned transmission system in accordance with the third embodiment (see FIG. 6).

If the input of the switch 701 is set to the parity check signal PC1, and if the input of the switch 704 is set to the signal Sf, then a transmission system where the master and slave of the transmission system 100 of the first embodiment are switched can be implemented. This means that the slave communication device 110 checks errors only on the transmission path 140, and the master communication device 120 checks errors on the transmission paths 130 and 140.

If the input of the switch 701 is set to the parity check signal PC1, and if the input of the switch 704 is set to the signal Sb, then a transmission system where the master and slave of the transmission system 300 of the second embodiment are switched can be implemented.

If the input of the switch 701 is set to the parity check signal PC1, and if the input of the switch 704 is set to the signal S2, then a transmission system where the master and slave of the transmission system 600 of the third embodiment are switched can be created.

In this way, with the transmission system 700 of this embodiment, one of the systems 100, 300 and 600 shown in the first~third embodiments can be selectively applied, and the master communication device and the slave communication device can be arbitrarily switched.

Also with this embodiment, the first and second low speed signals S1 and S2 can be simultaneously transmitted by connecting the input of the switch 701 to the low speed signal S1 and by connecting the input of the switch 704 to the low speed signal S2. In this case, however, it is desirable to minimize information exchange using the low speed signals S1 and S2, since transmission errors on the transmission path cannot be monitored during this connection.

The Fifth Embodiment

Figure 8:
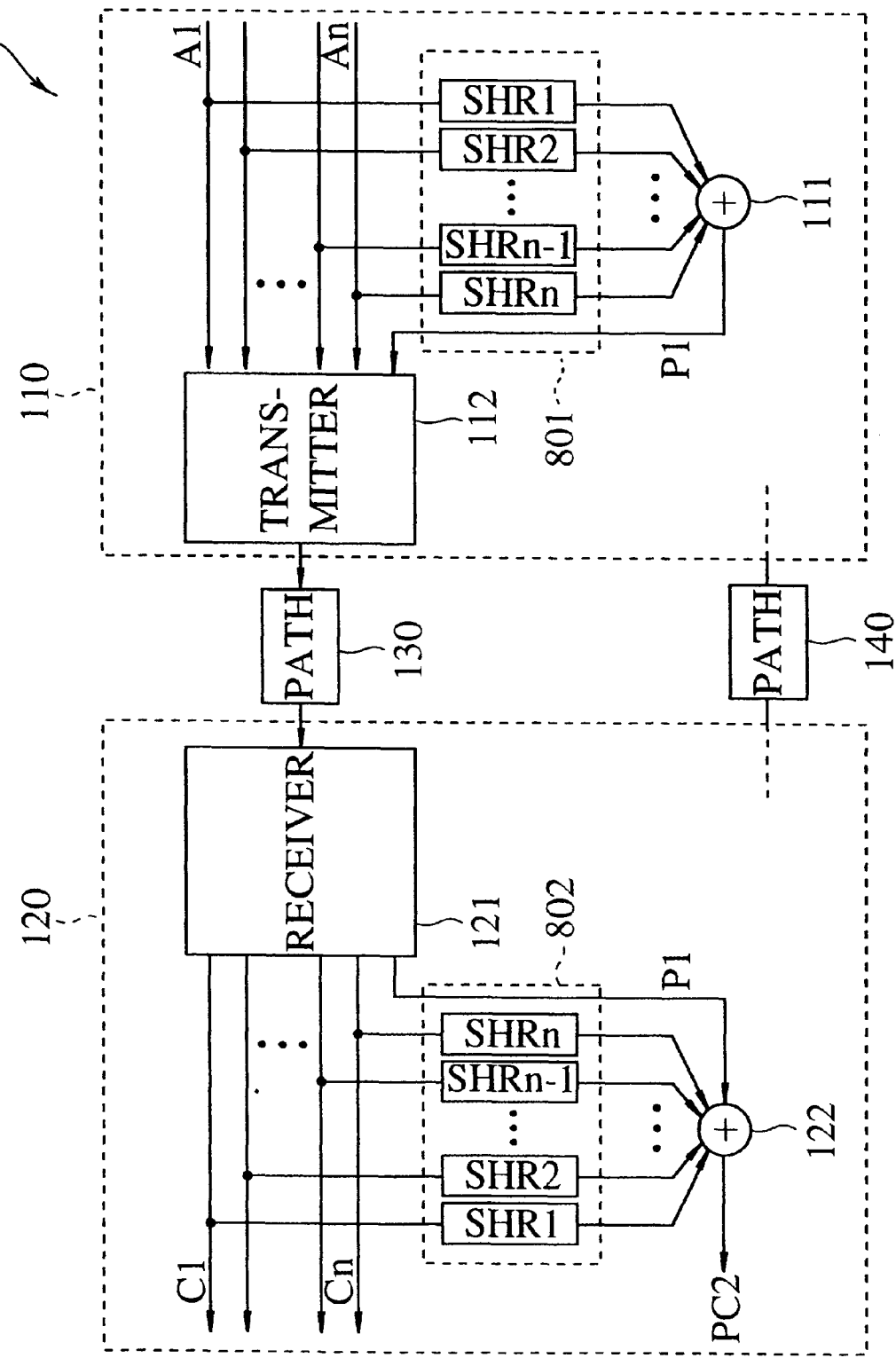
FIG. 8 is a block diagram depicting an overview of the configuration of the transmission system in accordance with the fifth embodiment.
Figure 9:
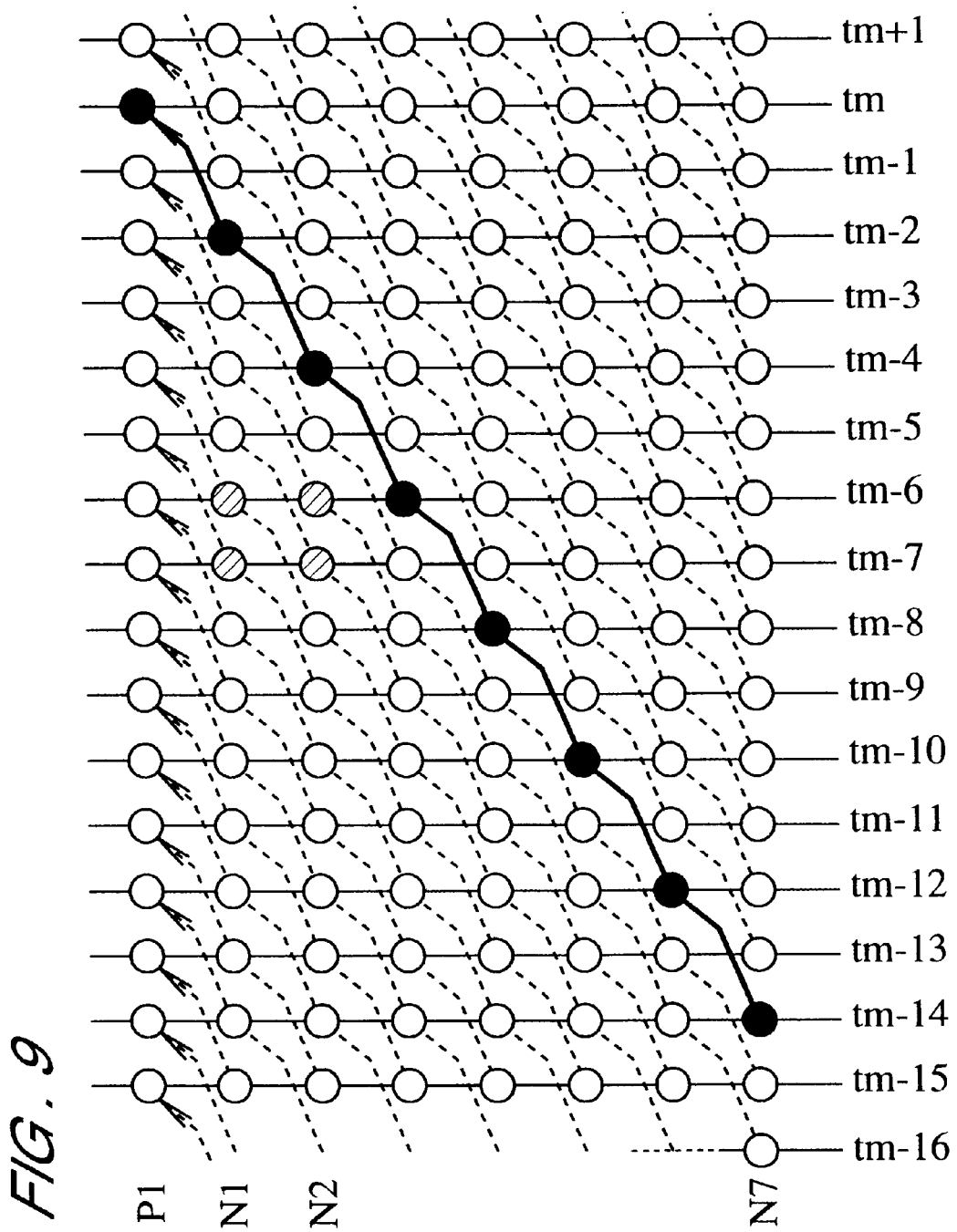
FIG. 9 is a diagram for explaining the operation principle of the transmission system in accordance with the fifth embodiment.

Next a transmission system in accordance with the fifth embodiment is described referring to FIG. 8 and FIG. 9.

A difference of this embodiment from the above mentioned first embodiment is that parity check is performed for n units of main data which belong to different signal blocks.

FIG. 8 is a block diagram depicting the configuration of a key area of the transmission system 800 in accordance with this embodiment. In FIG. 8, if an element has the same numeral or sign as FIG. 1, it means that the element is the same as in FIG. 1.

In the communication device 110, a delay circuit 801 is installed between the n bits of signal lines A1~An and the adder 111. The delay circuit 801 has n units of delay elements SHR1~SHRn. The delay elements SHR1, SHR2, ---, SHRn are connected to the signal lines A1, A2, ---, An respectively. The delay time of the elements SHR2~SHRn is a multiple of the delay time of the element SHR1 respectively. This means that if the delay time of SHR1 is $\Delta t$, then the delay time of SHR2 is $2 \times \Delta t$, SHR3 is $3 \times \Delta t$ --- and SHRn is $n \times \Delta t$. In this embodiment, the delay time of SHR1 is double the interval when the transmitter 112 transmits signal blocks.

In the communication device 120, a delay circuit 802 is installed between the n bits of signal lines C1~Cn and the adder 122. The delay circuit 802 has delay elements SHR1~SHRn, which are the same as the delay circuit 801. The delay elements SHR1, SHR2, ---, SHRn are connected to the signal lines C1, C2, ---, Cn respectively.

The delay elements SHR1~SHRn can be created, for example, by a shift register with a number of stages depending on the delay time.

Next the operation principle of the transmission system 800 shown in FIG. 8 is described referring to FIG. 9. In FIG. 9, N1~N7 indicate the main data to be transmitted from the signal lines A1~A7 to the transmitter 112. In FIG. 9, n=7 was used to simply the description. tm−16~tm+1 indicate time when a signal block is transmitted.

As FIG. 9 conceptually shows, the transmitter 112 transmits a signal block having the parity bit P1 and the main data N1~N7 at time tm−16, tm−15, ---, tm, tm+1. Because of the above mentioned configuration of the delay circuit 801, the main data N1, N2, ---, N7 used for the computation of the parity bit P1 to be transmitted at time tm is transmitted at time tm−2, tm−4, ---, tm−14 respectively. Computation is performed using each main data connected with the dotted line in FIG. 9 in the same manner, and the parity bit P1 shown by the arrow mark is obtained.

We will now consider the case when a transmission error occurred to the main data N1 and N2 at time tm−7, and when a transmission error occurred to the main data N1 and N2 at time tm−6.

In the transmission system 100 in accordance with the first embodiment, the parity bit P1 computed using the main data N1~N7 which are transmitted at time tm−7 is transmitted as the same signal block as data N1~N7. Therefore, if two transmission errors simultaneously occurred in one signal block, the parity bit P2 computed by the adder 122 (see FIG. 8) matches with the parity bit P1. Because of this, the communication device 120 cannot recognize generated transmission errors. In the same way, the communication device 120 cannot recognize the generation of transmission errors of the main data transmitted at time tm−6, since two transmission errors simultaneously occurred. Therefore, the transmission system 100 of the first embodiment cannot recognize the existence of erred data if an even number of erred data were generated simultaneously.

With the transmission system of this embodiment, on the other hand, the main data N1~N7 used for computation of the parity bit are transmitted as different signal blocks respectively. Therefore even if two data errors occurred in one signal block, the number of erred data is only one in the computation of the parity bit P2, and the communication device 120 can recognize the existence of erred data.

As mentioned above, the transmission error generation rate is normally very low, so the probability that a plurality of erred data will be simultaneously generated can be ignored. Normally the probability that the number of erred data will become an even number can also be ignored. However, when such a disturbance as lightning occurs, for example, a burst of transmission errors and the probability that an even number of erred data will be simultaneously generated may not be ignored.

Depending on the type of disturbance, a transmission error may occur to each one of the multiple signal blocks which are transmitted continuously. Therefore it is desirable to extract one main data for a multiple number of transmissions to compute the parity bit P1, rather than to extract one main data for each one of the signal blocks to be transmitted continuously to compute the parity bit P1. In the case of FIG. 9, for example, one main data is extracted for every two transmissions. If the interval of extracting data is long, however, the number of stages of the delay elements SHR1~SHRn must be increased, which increases circuit scale, and also increases the time required to prepare data necessary for a one time parity check (that is, an idle bit). Consequently, the interval of extracting data should be decided according to the degree of reliability demanded for the transmission system.

The technology of this embodiment can also be applied to data transmitted on the transmission path 140, however a description of this is omitted here.

In the above description, the case where the technology of this embodiment is applied to the transmission system of the first embodiment is described, however this embodiment can also be applied to the transmission systems of the second~fourth embodiments.

In this way, this embodiment has an effect of increasing transmission error detection accuracy, in addition to the effects similar to the above mentioned first~fourth embodiments.

The Sixth Embodiment

Figure 10:
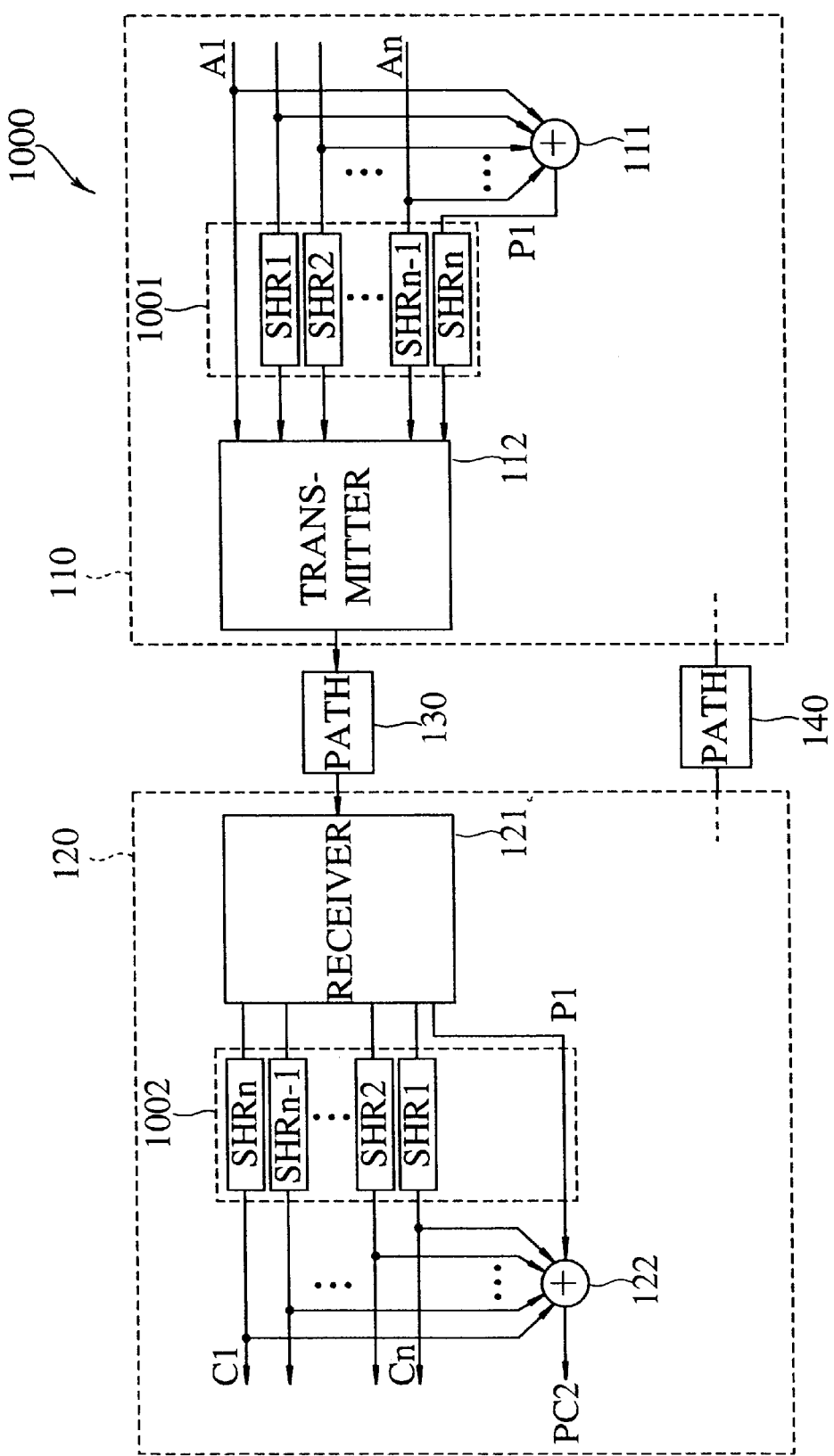
FIG. 10 is a block diagram depicting an overview of the configuration of the transmission system in accordance with the sixth embodiment.
Figure 11:
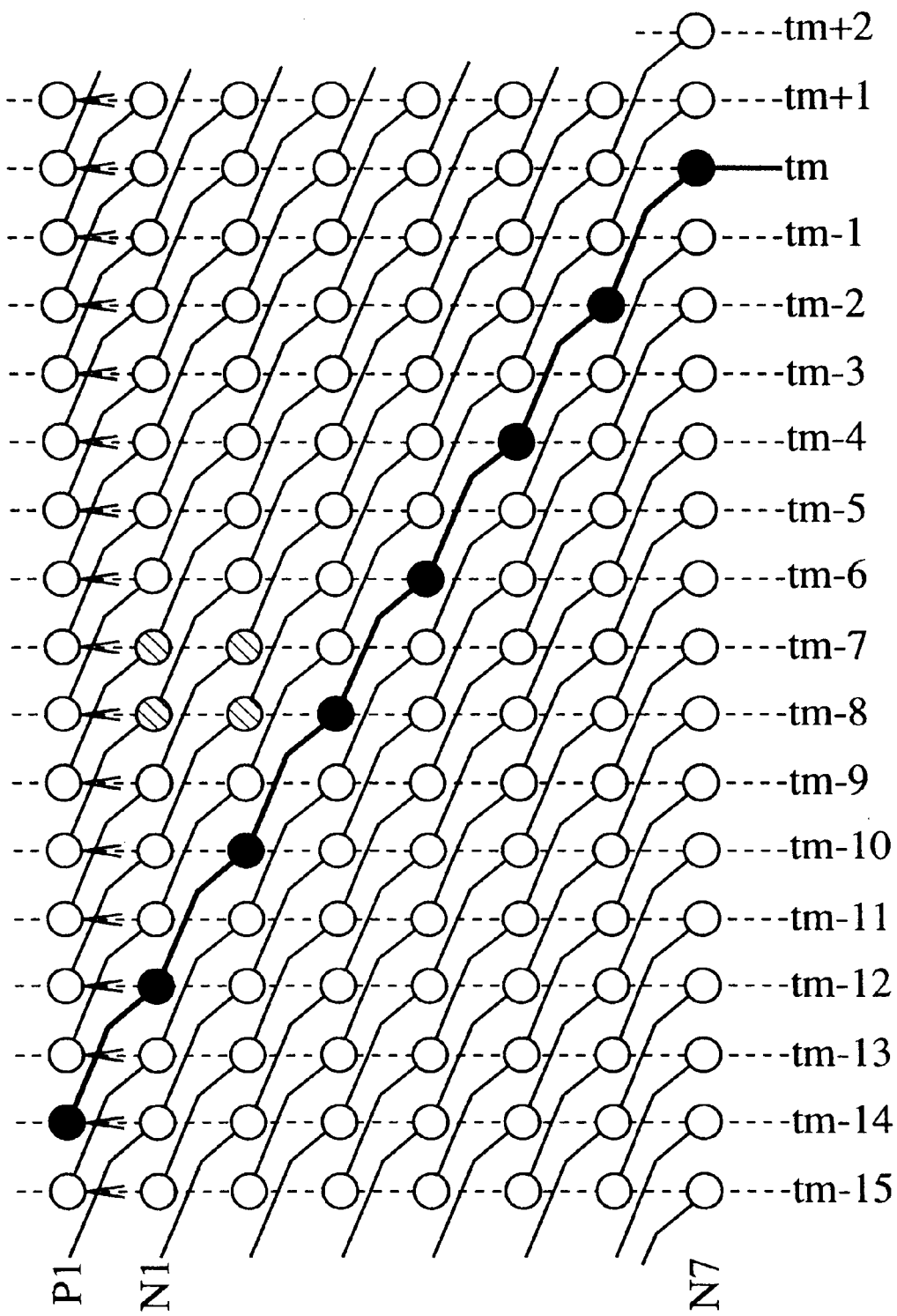
FIG. 11 is a diagram for explaining the operation principle of the transmission system in accordance with the sixth embodiment.

Next a transmission system in accordance with the sixth embodiment is described referring to FIG. 10 and FIG. 11.

This embodiment is similar to the above mentioned fifth embodiment in which the n units of main data used for one parity bit computation is transmitted as different signal blocks.

FIG. 10 is a block diagram depicting the configuration of a key area of the transmission system 1000 in accordance with this embodiment.

In FIG. 10, if an element has the same numeral or sign as FIG. 1, it means that the element is the same as in FIG. 1.

In the communication device 110, a delay circuit 1001 is installed between the n bits of signal lines A1~An and signal line A0 for parity bit and the transmitter 112. This delay circuit 1001 has n units of delay elements SHR1~SHRn. As shown in FIG. 10, the delay elements SHR1, SHR2, - - - , SHRn are connected to the signal lines A2, A3, - - - , A0 respectively, and the signal line A1 is not connected to a delay element. The delay time of the elements SHR2~SHRn is the same as the delay elements of the above mentioned fifth embodiment respectively.

In the communication device 120, a delay circuit 1002 is installed between the receiver 121 and the n bits of signal lines C1~Cn and the signal line C0 for parity bit. This delay circuit 1002 has delay elements SHR1~SHRn which are the same as the delay circuit 801. The delay elements SHR1, SHR2, - - - , SHRn are connected to the signal lines Cn, Cn−2, - - - C1 respectively, and the signal line C0 is not connected to a delay element.

Next the operation principle of the transmission system 1000 shown in FIG. 10 is described referring to FIG. 11. In FIG. 11, N1~N7 indicate the main data to be transmitted from the signal lines A1~A7 to the transmitter 112. In FIG. 11, n=7 was used to simplify the description. tm−15~tm+1 indicate time when a signal block is transmitted.

As FIG. 11 conceptually shows, the transmitter 112 transmits a signal block consisting of the parity bit P1 and the main data N1~N7 at time tm−15, tm−14, - - - tm, tm+1.

In FIG. 11, computation is performed using each main data connected with the dotted line, and the parity bit P1 shown by the arrow mark is obtained. Because of the above mentioned configuration of the delay circuit 1001, the main data N1, N2, - - - N7 used for the computation of the parity bit P1 to be transmitted at time tm−14 is transmitted at time tm−12, tm−10, - - - , tm.

Now the case when a transmission error occurred to the main data N1 and N2 at time tm−8, and when a transmission error occurred to the main data N1 and N2 at time tm−7 is considered.

In the transmission system of this embodiment, the main data N0~N7 used for the operation of the parity bit P1 is transmitted in two or more later signal blocks after this parity bit P1. Therefore even if an even number of data errors occur to one signal block, the number of erred data is only one in the operation of the parity bit P2, so the communication device 120 can recognize the existence of erred data.

The technology of this embodiment can also be applied to the data transmitted on the transmission line 140, however a description is omitted here.

In the above description, the case when the technology of this embodiment is applied to the transmission system of the first embodiment was described, but this technology can also be applied to the transmission systems of the second~fourth embodiments.

In this way, this embodiment has an effect of increasing transmission error detection accuracy, in addition to the effects similar to the above mentioned first~fourth embodiments.

The Seventh Embodiment

Figure 12:
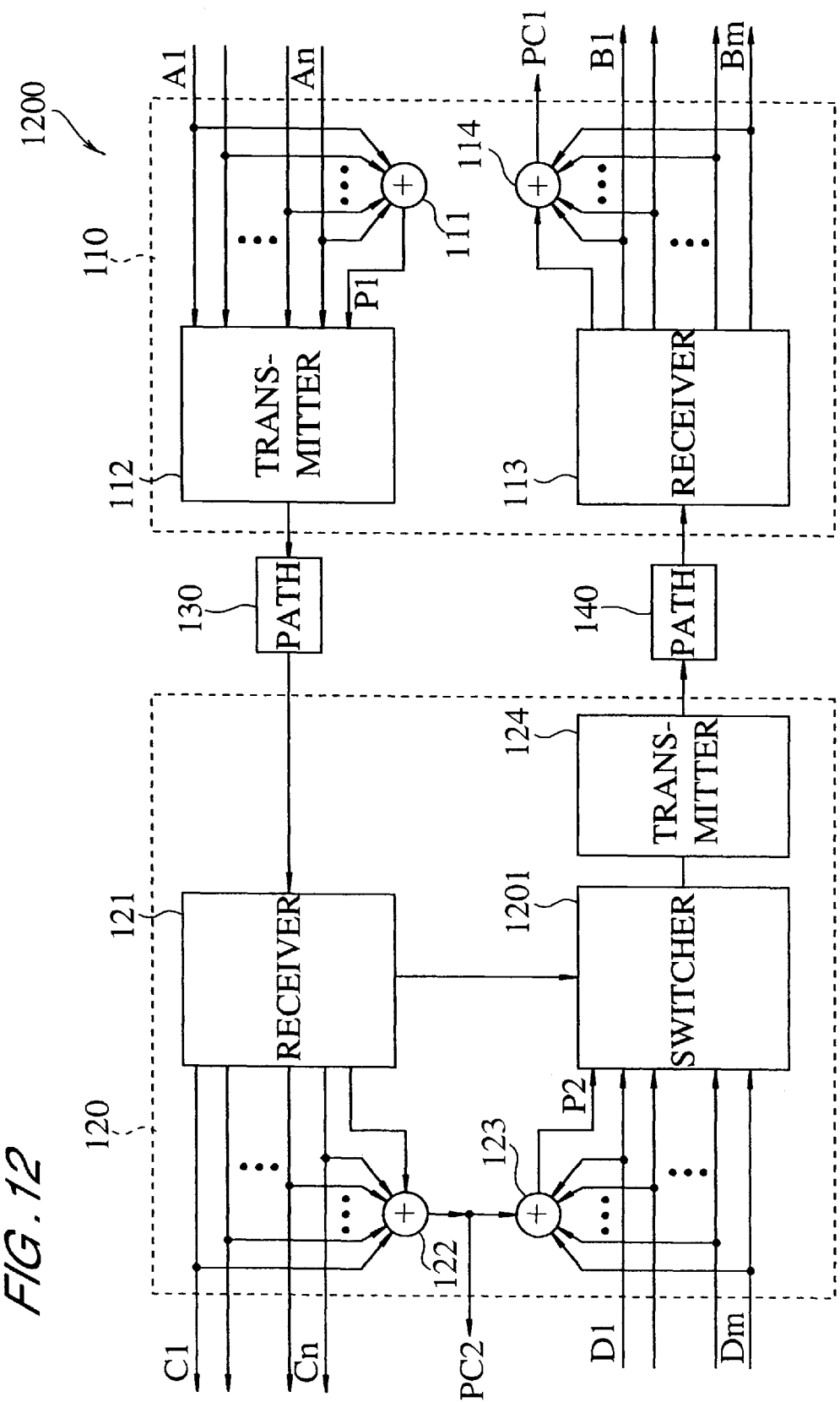
FIG. 12 is a block diagram depicting an overview of the configuration of the transmission system in accordance with the seventh embodiment.

Next a transmission system in accordance with the seventh embodiment is described referring to FIG. 12.

In FIG. 12, if an element has the same numeral or sign as FIG. 1, it means that the element is the same as in FIG. 1.

As FIG. 12 shows, a difference of the transmission system 1200 in accordance with this embodiment from the above mentioned first embodiment is that the communication device 120 has a signal switcher 1201.

The signal switcher 1201 selects either the signal block which is input from the receiver 121 or the signal block which is input from the signal lines D1~Dm and the adder 123, and outputs the selected signal block to the transmitter 124.

If a transmission error did not occur in the transmission system 1200 shown in FIG. 12, the signal switcher 1201 selects input from the signal lines D1~Dm and the adder 123. The general operation of the system 1200 in this case is the same as that of the first embodiment.

If a transmission error is discovered by one of the parity check signals PC1 and PC2, the signal switcher 1201 switches input. By this switching, the signal block received by the receiver 121 is returned to the communication device 110 via the transmitter 124 and the transmission path 140.

If the parity check signal PC2 still indicates a transmission error even after the signal switcher 1201 is switched so that the signal block received by the receiver 121 is returned, it is highly possible that the communication device 110, transmission path 130, transmission path 140, receiver 121, or transmitter 124 is at fault.

If a transmission error is no longer detected after the signal switcher 1201 is switched, on the other hand, it is highly possible that either the adder 123 or the adder 122 is at fault.

In the system 1200 of this embodiment, it is desirable to change the sequence of the main data in the signal block when the receiver 121 returns the received signal block. If the sequence when passing through the transmission path 130 is N1, N2, - - - , Nn, P1 (N1~Nn are main data), for example, it is desirable to change the sequence when passing through the transmission path 140 to Nn, Nn–1, - - - , N1, P1. Such a change of sequence makes it easy to judge whether the error occurred to either the transmission path 130 or the transmission path 140.

In the above explanation, the case when the technology of this embodiment is applied to the transmission system of the first embodiment was described, but this technology can also be applied to the transmission systems of the second~sixth embodiments.

In this way, this embodiment has an effect of allowing a loop back test, in addition to the effects similar to the above first to sixth embodiments.

The Eighth Embodiment

Figure 13:
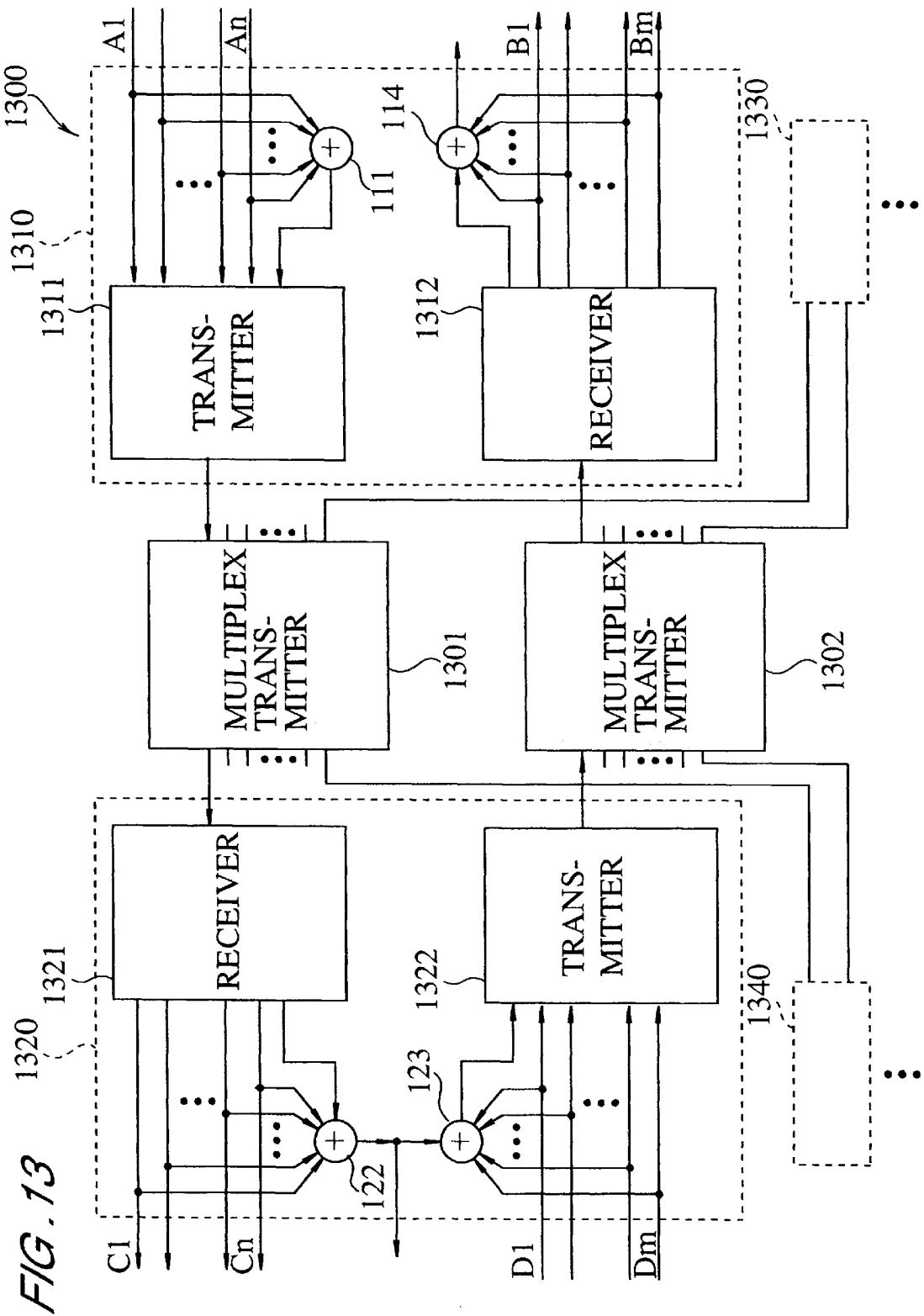
FIG. 13 is a block diagram depicting an overview of the configuration of the transmission system in accordance with the eighth embodiment.

Next a transmission system in accordance with the eighth embodiment is described referring to the FIG. 13. This embodiment is an example when this invention is applied to a multiplex transmission system.

In FIG. 13, if an element has the same numeral or sign as FIG. 1, it means that the element is the same as in FIG. 1.

As FIG. 13 shows, the transmission system 1300 of this embodiment has a plurality of master communication devices 1310, 1330, - - - , and a plurality of slave communication devices 1320, 1340, - - - .

Each communication device 1310, 1320, - - - has a transmitter 1311, 1322, - - - which performs parallel/serial conversion, and has the receiver 1312, 1321, - - - which performs serial/parallel conversion.

The multiplex transmitter 1301 transmits a signal block received from one of the master communication devices 1310, 1330, - - - to one of the slave communication devices 1320, 1340, - - - .

The multiplex transmitter 1302 transmits a signal block received from one of the slave communication devices 1320, 1340, - - - to one of the master communication devices 1310, 1330, - - - .

This configuration can also implement a transmission system where the master communication devices 1310, 1330, - - - can detect a transmission error on both the transmission path and the receive path.

In this embodiment, the case when a system in accordance with the first embodiment is multiplexed was described as an example, but it is also possible to multiplex the systems of the second to seventh embodiments.

In this embodiment, serial transmission was used for the transmission between the communication devices, but parallel transmission as well may be used.

Also in this embodiment, transmission from the master communication device to the slave communication device was performed by a multiplex transmitter that was different from the one used for transmission from the slave communication device to the master communication device, but the same multiplex transmitter may be used for bi-directional transmission.

Figure 14:
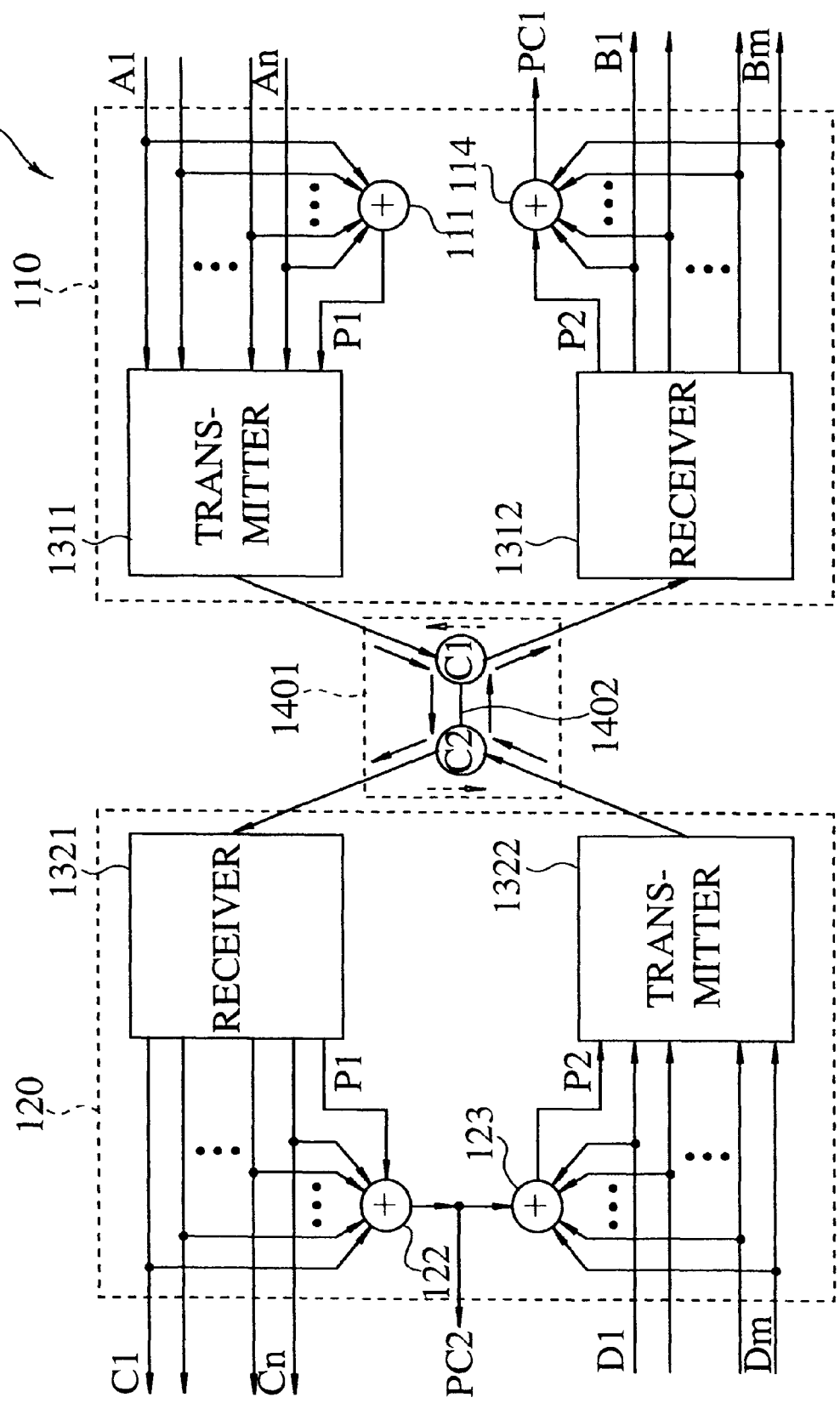
FIG. 14 is a block diagram depicting an overview of the configuration of a variant form of the eighth embodiment.

FIG. 14 shows a system 1400 which performs bi-directional transmission by the same multiplex transmitter.

As FIG. 14 shows, in this system the multiplex transmitter 1401 comprises circulators C1 and C2, and a cable 1402 which connects these circulators C1 and C2.

Since the structure of the circulators C1 and C2 is well known, a description is omitted.

The Ninth Embodiment

Figure 15:
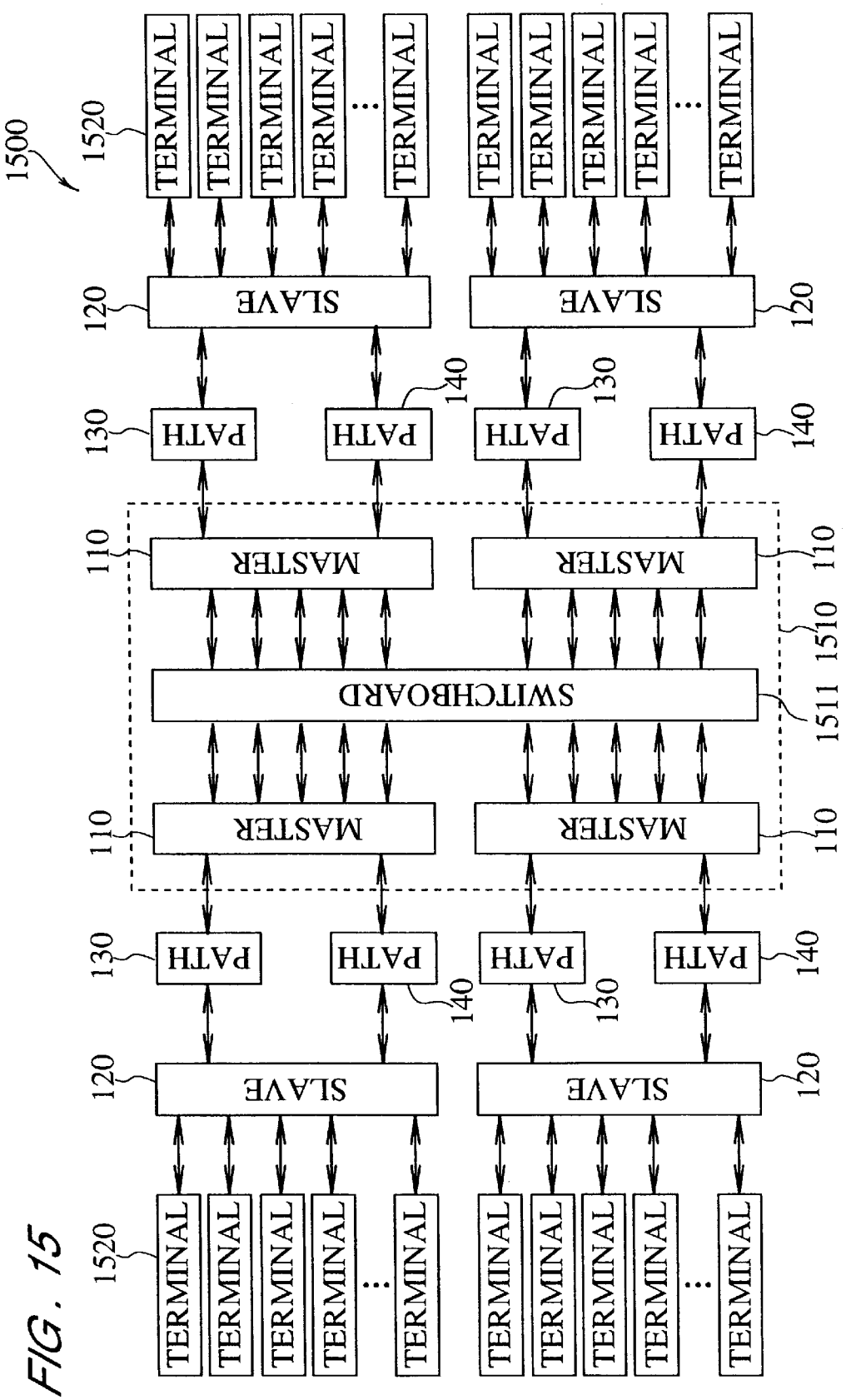
FIG. 15 is a block diagram depicting an overview of the configuration of the transmission system in accordance with the ninth embodiment.

Next the ninth embodiment is described referring to FIG. 15. This embodiment is an example when a transmission system in accordance with the present invention is applied to a large scale transmission system.

As FIG. 15 shows, the exchange office 1510 comprises the switchboard 1511 and a plurality of master communication devices 110 connected to the switchboard. Each master device 110 communicates with a slave device 120 by the transmission paths 130 and 140. Each slave device 120 is connected to one or more units of the user terminals 1520.

The system in accordance with the above mentioned first eighth embodiments can be applied to the system comprising the communication device 110 and 120 and the transmission paths 130 and 140.

In this transmission system 1500, the exchange office 1510 can constantly monitor the transmission error generation status of the transmission and receive systems.

Since the exchange office 1510 can monitor the transmission quality of both of the transmission paths 130 and 140, the slave device 120 can be unattended. This allows installing the slave device 120 at an arbitrary position, such as inside a box on a mast.

For example, a transmission path provider can install a plurality of slave devices 120 on masts, and connect these slave devices 120 and the exchange office 1510 with high-speed transmission paths 130 and 140 using optical cable for example, and can connect a user terminal 1520 to the closest slave device 120 according to the user contract.

If the number of user terminals 1520 connected to one slave device 120 exceeds the prescribed number, the slave device 120 can be removed from the mast and exchanged with one that has a larger capacity. The removed slave device 120 can be reinstalled at a mast in another area.

An optical cable allows several tens km digital transmission without a repeater, so a transmission system can be constructed with a few exchange offices 1510 with many slave devices 120 installed over a long distance. By applying this invention to such a transmission system, an optical communication network which performs efficient centralized control at minimum cost can be constructed.

As described above, the transmission system in accordance with the present invention allows detecting both an error generated during transmission from the master to the slave and an error generated during transmission from the slave to the master by parity check of the master communication device.

Therefore the present invention can provide a transmission system which can detect the transmission quality of both the transmission path and the receiving path without dropping substantial transmission speed.

What is claimed is:

1. A transmission system, comprising:
a master communication device for transmitting first main data and a first parity bit, and for receiving second main data and a second parity bit;
a slave communication device for receiving said first main data and said first parity bit from said master communication device, and for transmitting said second main data and second parity bit to said master communication device;
a first operation circuit installed in said master communication device, for generating said first parity bit from a first data constellation including each bit of said first main data;
a second operation circuit installed in said slave communication device for performing a parity check using said first main data and said first parity bit, both of which are received by said slave communication device from said master communication device, and for outputting a first parity check bit which indicates a result of said first parity check;
a third operation circuit installed in said slave communication device and receiving said first parity check bit from said second operation circuit, said third operation circuit generating said second parity bit from a second data constellation including said first parity check bit and each bit of said second main data; and
a fourth operation circuit installed in said master communication device performing a second parity check using said second main data and said second parity bit, and for outputting a second parity check, bit based on said second parity check, wherein said master communication device can detect an error in transmission of one of said first main data and said second man data based on the result of said second parity check.

2. The transmission system according to claim 1, wherein the first parity bit computed by said first operation circuit and the first main data used for computation of the first parity bit are transmitted from said master communication device to said slave communication device as the same signal block, and the second parity bit computed by said third operation circuit and said second main data used for computation of said second parity bit are transmitted from said slave communication device to said master communication device as the same signal block.

3. The transmission system according to claim 1 wherein said first data constellation further comprises a prescribed pattern of a reflected signal, and said slave communication device further comprises decision means for comparing a pattern of said first parity check bit and said prescribed pattern.

4. The transmission system according to claim 1, wherein said second data constellation further comprises a prescribed pattern of a reflected signal, and said master communication device further comprises decision means for comparing a pattern of said second parity check bit and said prescribed pattern.

5. The transmission system according to claim 1 wherein said first data constellation further comprises one of multiple types of low speed signals with prescribed patterns, and said slave communication device further comprises decision means for comparing a pattern of said first parity check bit and said patterns of said multiple types of low speed signals.

6. The transmission system according to claim 1, wherein said second data constellation further comprises one of multiple types of low speed signals with prescribed patterns, and said master communication device further comprises decision means for comparing a pattern of said second parity check bit and said patterns of said multiple types of low speed signals.

7. The transmission system according to claim 1, further comprising a first delay circuit connected to an input terminal of said first operation circuit so that said first operation circuit computes first parity bits of said first main data transmitted by mutually different signal blocks; and a second delay circuit connected to an input terminal of said second operation circuit for performing said first parity check of said first main data.

8. The transmission system according to claim 1, further comprising a first delay circuit connected to an input terminal of said third operation circuit so that said third operation circuit computes said second parity bits of said second main data transmitted by mutually different signal blocks; and a second delay circuit connected to an input terminal of said fourth operation circuit for performing said second parity check of said second main data.

9. The transmission system according to claim 1, further comprising a first delay circuit connected to an input terminal of a transmission means of said master communication device so that a plurality of said first main data simultaneously used for computation by said first operation circuit is transmitted by mutually different signal blocks; and a second delay circuit connected to an output terminal of a receiving means of said slave communication device for restoring said first main data.

10. The transmission system according to claim 1, further comprising a first delay circuit connected to an input terminal of a transmission means of said slave communication device so that a plurality of said second main data simultaneously used for computation of said third operation circuit is transmitted by mutually different signal blocks; and an second delay circuit connected to an output terminal of a receiving means of said master communication device for restoring said second main data.

11. The transmission system according to claim 1, further comprising signal switching means installed in said slave communication device so that either a signal block that includes externally input main data and said second parity bit computed by said third operation circuit or a signal block received from said master communication device is selected and transmitted to said master communication device.

12. The transmission system according to claim 1, comprising a plurality of said master communication devices, a plurality of said slave communication devices, and one or more multiplexed transmission means.

13. The transmission system according to claim 12, wherein said multiplexed transmission means further comprise two circulators and a cable for connecting these circulators.

14. The transmission system according to claim 1, comprising an exchange office that has one switchboard and a plurality of said master communication devices connected to the switchboard; a plurality of said slave communication devices connected to said master communication device via transmission means; and one or more communication terminals connected to each one of said slave communication devices.

15. The transmission system according to claim 1 further comprising:

switching means communicating with said first operation circuit, said switching means variably providing one of a reflected signal, a low speed signal, a fixed signal, and said second parity check bit to said first operation circuit as a part of said first data constellation for generating said first parity bit; and decision means in said slave communication device for comparing a pattern of said first parity check bit and patterns of said reflected signal, said low speed signal, and said fixed signal.

16. The transmission system according to claim 1 further comprising:

switching means communicating with said third operation circuit, said switching means variably providing one of a reflected signal, a low speed signal, a fixed signal, and said first parity check bit to said third operation circuit as a part of said second data constellation for generating said second parity bit; and decision means in said master communication device for comparing a pattern of said second parity check bit and patterns of said reflected signal, said low speed signal, and said fixed signal.

17. The transmission system according to claim 1, wherein said second parity bit is generated by calculating Exclusive OR of said first parity check bit value and a parity value of said second main data.

* * * * *